United States Patent

Kurita et al.

[11] Patent Number: 5,250,520
[45] Date of Patent: Oct. 5, 1993

[54] POLYSULFATE OF CYCLODEXTRIN DERIVATIVE AND PROCESS FOR PREPARING THE SAME

[75] Inventors: Hironori Kurita, Warabi; Tamon Moriya, Takatsuki; Toru Otake; Haruyo Mori, both of Nara; Motoko Morimoto, Osaka, all of Japan

[73] Assignee: Tanabe Seiyaku Co., Ltd., Osaka, Japan

[21] Appl. No.: 668,634

[22] Filed: Mar. 13, 1991

[30] Foreign Application Priority Data

Mar. 15, 1990 [JP] Japan ................................ 2-65924
Mar. 15, 1990 [JP] Japan ................................ 2-65925
Mar. 15, 1990 [JP] Japan ................................ 2-65926
Sep. 27, 1990 [JP] Japan ................................ 2-259257
Sep. 27, 1990 [JP] Japan ................................ 2-259258

[51] Int. Cl.$^5$ .................. A01N 43/04; A01N 53/00; C08B 37/16; C08B 37/02
[52] U.S. Cl. ........................... 514/58; 514/54; 514/531; 536/103; 536/112
[58] Field of Search .................. 514/58, 54, 531; 536/103, 112

[56] References Cited

U.S. PATENT DOCUMENTS

| H811 | 8/1990 | Nasu et al. | 514/531 |
|---|---|---|---|
| 3,974,274 | 8/1976 | Kurita et al. | 536/103 |
| 4,020,160 | 4/1977 | Bernstein et al. | 536/103 |
| 4,066,829 | 1/1978 | Nair et al. | 514/58 |
| 4,258,180 | 3/1981 | Lewis et al. | 536/112 |
| 4,638,058 | 1/1987 | Brandt et al. | 536/103 |
| 4,783,446 | 11/1988 | Neushul | 514/54 |
| 4,840,941 | 6/1989 | Ueno et al. | 514/59 |

FOREIGN PATENT DOCUMENTS

| 63-45223 | 2/1988 | Japan . |
|---|---|---|
| 1-25724 | 1/1989 | Japan . |
| 9000596 | 1/1990 | World Int. Prop. O. . |

OTHER PUBLICATIONS

Chemical Abstract 113:18424e, 1-Pharmacology, vol. 113, 1990.
Croft et al., "Tetrahedron Report No. 147, Synthesis of Chemically Modified Cyclodextrins", Tetrahedron, vol. 39, No. 9, pp. 1417-1474 (1983).
Durette et al.; Chemical Abstracts; vol. 90, (1979); 23451v.
Igakunoayumi (Walking of Medicine), vol. 142, No. 9, pp. 619-622 (1987).

Primary Examiner—Michael G. Wityshyn
Assistant Examiner—L. Leary
Attorney, Agent, or Firm—Birch, Stewart, Kolasch & Birch

[57] ABSTRACT

A polysulfate of a cyclodextrin in which at least one of 6 to 8 D-glucose units constituting the cyclodextrin has been replaced by a unit represented by Formula(1):

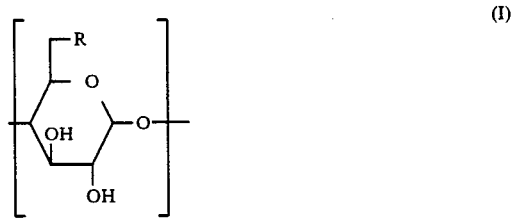

(I)

wherein R is a group represented by the formula:

$-OSO_2R^1$,  1)

$-SR^2$,  2)

$\begin{matrix} R^3 \\ | \\ -NR^4 \end{matrix}$,  3)

$-NHSO_2R^5$ or  4)

$\begin{matrix} R^7 \\ | \\ -NCOR^6 \end{matrix}$;  5)

where $R^1$ to $R^7$ are defined in the specification, which have an excellent antiretrovirus activity, particularly an excellent proliferation-inhibiting activity against HIV.

5 Claims, No Drawings

POLYSULFATE OF CYCLODEXTRIN DERIVATIVE AND PROCESS FOR PREPARING THE SAME

BACKGROUND OF THE INVENTION

This invention relates to a novel polysulfate of a cyclodextrin derivative having antiretrovirus activity and processes for preparing the same.

AIDS (aquired immunodefficiency syndrome) is a lethal or extremely malignant disease which is caused by infection of human immunodeficiency virus (HIV) which is a kind of retroviruses. Prevention and destruction thereof are now most serious problem to be overcome by human being with world-wide scale.

As a compound having antiretrovirus activity, there have been known, for example, azidothimidine (IGAKUNOAYUMI (Walking of Medicine), Vol. 142, No. 9, pp. 619 to 622 (1987)), sulfated polysaccharides (Japanese Provisional Patent Publications No. 45223/1988 and No. 25724/1989), and the like.

However, it has not yet fully been made clear or confirmed whether or not conventionally known chemicals having an anti-retrovirus activity are effective for and safe to the therapy of AIDS.

SUMMARY OF THE INVENTION

An object of the present invention is to provide a novel compound having an excellent antiretrovirus activity, particularly an excellent proliferation-inhibiting activity against HIV.

Another object of the present invention is to provide a process for preparing the novel compound.

Further object of the present inventions to provide intermediate compounds for preparing the novel compound.

The present invention relates to a polysulfate of a cyclodextrin in which at least one of 6 to 8 D-glucose units constituting the cyclodextrin has been replaced by a unit represented by Formula(I):

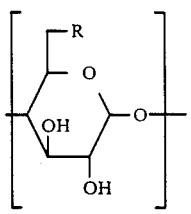

(I)

wherein R is a group represented by the

1) $-OSO_2R^1$,

2) $-SR^2$,

3) $-NR^4$ with $R^3$,

4) $-NHSO_2R^5$ or

5) $-NCOR^6$ with $R^7$;

where $R^1$ represents a mesityl group;

$R^2$ represents an alkyl group; a lower alkyl group having 1 to 3 substituted or unsubstituted phenyl groups; a substituted or unsubstituted phenyl group or a nitrogen-containing heterocyclic group which may have substitutent(s); one of $R^3$ and $R^4$ represents a lower alkyl group; a hydroxy-substituted lower alkyl group; an amino-substituted lower alkyl group; a cycloalkyl group; a substituted or unsubstituted phenyl group or a substituted or unsubstituted phenyl-substituted lower alkyl group; and the other represents a hydrogen atom or a lower alkyl group, or both may be combined at their ends to form a lower alkylene group, $R^5$ represents an alkyl group; a substituted or unsubstituted phenyl group; a naphthyl group; or a heterocyclic group containing one or two hetero atoms selected from nitrogen, oxygen and sulfur, which may have substituents(s);

$R^6$ represents an alkyl group; a substituted or unsubstituted phenyl group; a phenyl-substituted lower alkyl group; a sulfur-containing heterocyclic group; or a pyrenylcarbonyl-substituted lower alkyl group; and $R^7$ represents a hydrogen atom; or a lower alkyl group substituted by a lower alkanoylamino group or a benzoylamino group, or a salt thereof.

A process for preparing the above-defined polysulfate compound according to the present invention comprises reacting a cyclodextrin derivative in which at least one of 6 to 8 D-glucose units constituting the cyclodextrin is replaced by the unit or units represented by the above Formula(I), with a sulfonating agent, and then converting the product into a salt, if desired.

DESCRIPTION OF THE PREFERRED EMBODIMENTS

The polysulfate compound of the present invention may be represented more specifically as follows:

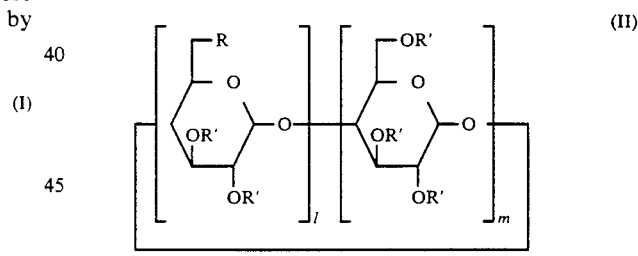

(II)

wherein R is of the same meaning as in Formula(I); at least one of R's represents a $SO_3H$ group and the other R's represent a hydrogen atom. Further, $l+m$ equals 6, 7 or 8. When the sum, $l+m$ equals 6, the polysulfate compound is a derivative of α-cyclodextrin. When the sum, $l+m$ equals 7, it is a derivative of β-cyclodextrin. When the sum $l+m$ equals 8, it is a derivative of γ-dextrin.

It should be understood that constructional glucose and substituted glucose unit(s) (I) are forming a cyclic ring in an arbitrary order through linkage between the 1-position and the 4-position.

The term "alkyl" in this specification means straight-chain or branched alkyl having 1 to 20 carbon atoms such as methyl, ethyl, propyl, butyl, pentyl, heptyl, octyl, nonyl and octadecyl.

The term "lower-alkyl" means straight-chain or branched alkyl having 1 to 4 carbon atoms such as methyl, ethyl, propyl and butyl.

The term "lower alkoxy" means alkoxy having 1 to 4 carbon atoms such as methoxy, ethoxyl, propoxy and butoxy.

The term "lower alkanoyl" means alkanoyl having 2 to 5 carbon atoms such as acetyl, propionyl, butyryl and valeryl.

The lower alkyl group having 1 to 3 substituted or unsubstituted phenyl groups, represented by $R^2$, includes a benzyl group, a trityl group, a phenethyl group, a chlorobenzyl group and a methoxybenzyl group.

The substituted or unsubstituted phenyl group, represented by $R^2$, includes a phenyl group, a chlorophenyl group, a methylphenyl group and a methoxyphenyl group.

The nitrogen-containing heterocyclic group which may have a substituent(s), represented by $R^2$, includes a dihydroxypyrimidinyl group and a purinyl group.

The hydroxy-substituted lower alkyl group represented by $R^3$ or $R^4$ includes a hydroxyethyl and a dihydroxypropyl group.

The amino-substituted lower alkyl group, represented by $R^3$ or $R^4$, includes an aminoethyl group.

The cycloalkyl group represented by $R^3$ or $R^4$ includes a cycloalkyl group having 3 to 8 carbon atoms such as a cyclohexy group.

The lower substituted or unsubstituted phenyl group represented by $R^3$ or $R^4$ includes a chlorophenyl group, a methylphenyl group, a methoxyphenyl group and an ethoxyphenyl group. The substituted or unsubstituted phenyl-substituted lower alkyl group represented by one of $R^3$ and $R^4$ includes a benzyl group, a methoxybenzyl group and a phenethyl group.

The lower alkylene group formed by a combination of $R^3$ and $R^4$ includes a butylene group and a pentamethylene group.

The substituted or unsubstituted phenyl group, represented by $R^5$, includes a phenyl group, a methylphenyl group, a methoxyphenyl group and a chlorophenyl group.

The heterocyclic group which may have substituents(s), represented by $R^5$, includes a furyl group, a thienyl group, an oxazolyl group, an isooxazolyl group, a thiazolyl group, an isothiazolyl group, a dimethylisooxazolyl group and a dimethylthiazolyl group. The sulfur-containing heterocyclic group represented by $R^6$ includes a thienyl group.

The substituted or unsubstituted phenyl group, represented by $R^6$, includes a phenyl group, a hydroxyphenyl group, a methylphenyl group and a methoxyphenyl group.

The phenyl-substituted lower alkyl group, represented by $R^6$, includes a benzyl group.

The pyrenylcarbonyl-substituted lower alkyl group, represented by $R^6$, includes a pyrenylcarbonylethyl group.

The lower alkyl group substituted by a lower alkanoylamino group or a benzoylamino group, represented by $R^7$, includes a lower alkyl group substituted by an acetylamino group, a propionylamino group or a benzoylamino group.

Of the polysulfate derivative of a cyclodextrin where R represents a group $-OSO_2R^1$, a polysulfate compound having 8 to 23 sulfate groups in the molecule is preferred.

Of the polysulfated derivative where R represents a group $-SR^2$, a polysulfate compound having 8 to 23 sulfate groups in the molecule is preferred, and there may be mentioned, as preferable compounds, a polysulfate compound where $R^2$ represents a $C_{1-20}$ alkyl group; a $C_{1-4}$ alkyl having 1 to 3 substituents selected from a phenyl group, a halogenosubstituted phenyl group and $C_{1-4}$ alkoxy-substituted phenyl group; a phenyl group; a halogeno-substituted phenyl group; a $C_{1-4}$ alkyl-substituted phenyl group; a $C_{1-4}$ alkoxysubstituted phenyl group; a dihydroxy-substituted pyrimidinyl group or purinyl group, Of the polysulfate derivative where R represents a group

a polysulfate compound having 8 to 23 sulfate groups in the molecule is preferred, and there may be mentioned, as preferable compounds, a polysulfate compound where one of $R^3$ and $R^4$ represents a $C_{1-4}$ alkyl group; a hydroxy-substituted $C_{1-4}$ alkyl group; an amino-substituted $C_{1-4}$ alkyl group; a $C_{3-8}$ cycloalkyl group; a phenyl group; a halogenosubstituted phenyl group; a $C_{1-4}$ alkyl-substituted phenyl group; a $C_{1-4}$ alkoxy-substituted phenyl group; a phenylsubstituted $C_{1-4}$ alkyl group; a $C_{1-4}$ alkoxyphenyl-substituted $C_{1-4}$ alkyl group; and the other is a hydrogen atom or a $C_{1-4}$ alkyl group; or both is combined at their ends to form a $C_{1-4}$ alkylene group.

Of the polysulfate derivative where R represents a group, $-NHSO_2R^5$, a polysulfate compound having 8 to 23 sulfate groups in the molecule is preferred, and there may be mentioned, as preferred compounds, a polysulfate compound where $R^5$ represents a $C_{1-20}$ alkyl group; a phenyl group; a halogeno-substituted phenyl group; a $C_{1-4}$ alkyl-substituted phenyl group; a $C_{1-4}$ alkoxy-substituted phenyl group; a naphthyl group; a thienyl group; a $C_{1-4}$ alkyl-substituted isooxazolyl group or a $C_{1-4}$ alkyl-substituted thiazolyl group.

Of the polysulfate derivative where R represents a group

a polysulfate compound having 8 to 23 sulfate groups in the molecule is preferred, and there may be mentioned, as preferable compounds, a polysulfate compound where $R^6$ represents a straight-chain or branched $C_{1-20}$ alkyl group; a phenyl group; a hydroxy-substituted phenyl group; a $C_{1-4}$ alkyl-substituted phenyl group; a $C_{1-4}$ alkoxy-substituted phenyl group; a phenyl-substituted $C_{1-4}$ alkyl group; a thienyl group or a pyrenylcarbonyl-substituted $C_{1-4}$ alkyl group and $R^7$ is a hydrogen atom; a $C_{2-5}$ alkanoylaminosubstituted $C_{1-4}$ alkyl group or a benzoylamino-substituted $C_{1-4}$ alkyl group.

More preferred examples of the compound of the invention are those of Formula (II) wherein R is a N-benzoyl-N-2-benzoylaminoethylamino group, an octadecanoylamino group, a hexanoylamino group, an octanoylamino group, a 1-pyrenylcarbonylpropanoylamino group, a 4-metoxyphenylamino group, a 2-naphthylsulfonyloxy group, an octylsulfonylamino group, a mesitylenesulfonyloxy group, a benzylthio group, a 4-chlorobenzylthio group, a 4-methoxybenzylthio group, a 4-methylphenylthio group, a 4-methoxyphenyl group or a purinylthio group.

The polysulfate compound according to the present invention may be prepared by reacting a cyclodextrin derivative in which at least one of 6 to 8 D-glucose units constituting the cyclodextrin is replaced by the unit or units represented by the above Formula(I), with a sulfonating agent, and then converting the product into a salt, if desired.

The reaction may be illustrated as follows:

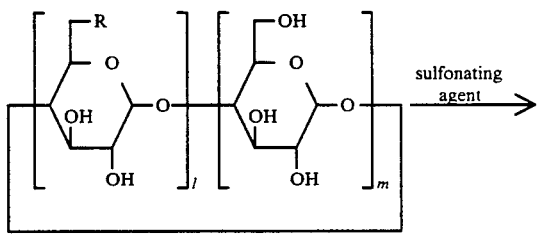

(III)

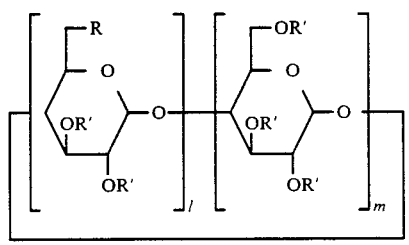

(II)

(wherein R, R', l, and m have the same meanings as defined above)

The reaction of Compound(III) with the sulfonating agent may be carried out in a suitable solvent.

As the sulfonating agent, there may suitably be used, for example, a sulfur trioxide complex such as sulfur trioxidepyridine complex, sulfur trioxide-trialkylamine complex, sulfur trioxide-dioxane complex, sulfur trioxidedimethylformamide complex and the like; anhydrous sulfuric acid; concentrated sulfuric acid; chlorosulfonic acid; and so on.

The amount of the sulfonating agent to be used may preferably be in excess of the amount of the starting compound(III). For example, in cases where sulfur trioxidepyridine complex or sulfur trioxide-trialkylamine complex is used as the sulfonating agent, the amount thereof to be used may preferably be 1 to 10 equivalents, especially 2 to 5 equivalents relative to the amount of Compound(III).

As the solvent for reaction, there may preferably be used, for example, a tertiary amine such as pyridine, picoline, lutidine, N,N-dimethylformamide, formamide, hexamethylenephosphoryltriamide, chloroform, benzene, toluene, xylene, water, a mixture of these solvents, liquid sulfur dioxide and so on.

The reaction can be carried out under cooling to under heating and may preferably be carried out under heating.

In the above-mentioned reaction, when a β-cyclohextrin in which R is a —OSO$_2$R$^1$ is used as the starting compound (III) and sulfur trioxide-pyridine or sulfur trioxide-trialkylamine complex is used as the sulfonating agent, there can be obtained a sulfate of a β-cyclohextrin in which one to 7 D-glucose units constituting β-cyclodextrin as been replaced by a unit represented by Formula (IV)

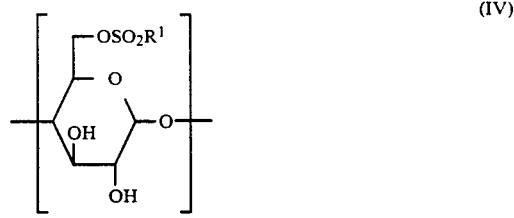

where R$^1$ is the same as defined above, and 0 to 2 D-glucose units has been replaced by a unit represented by Formula (V)

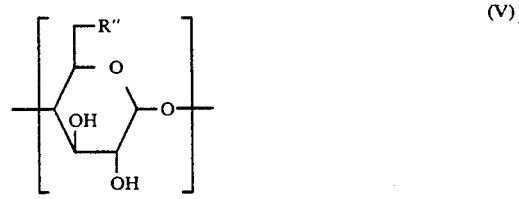

wherein R'' is a pyridinio group or a lower-alkylamino group.

The above-mentioned polysulfate compound may be represented more specifically as follows:

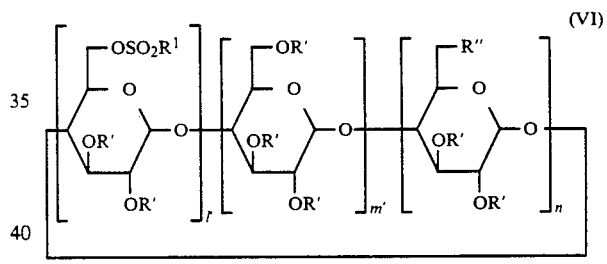

wherein R$^1$ is of the same meaning as in formula (I); at least one of R's represents a SO$_3$H group and the other R's represent a hydrogen atom; and R'' represents a pyridinio group or a lower-askylammonio group. Further, l'+m'+n equals 7. l' is an integer of 1 to 7; m' is an integer of 0 to 6 more accurately 0 to (l'+m'+n−1); n is an integer of 0 to 2.

More specifically, the product is obtained as a mixture of the compounds in which n is 0, 1, or 2 in Formula(VI) by selecting optionally the reaction conditions. For example, when the reaction is carried out at a temperature of 40° to 70° C., the compound in which n is 0 is the main product, and when the reaction is carried out at a temperature of 70° to 110° C., the compound in which n is 1 or 2 can be produced as the main product.

In the latter case, in cases where the sulfonating is sulfur trioxide-pyridine complex, a compound in which R$^1$ is a pyridinio group may be obtained, and in cases where it is sulfur trioxide-trialkylamine complex, a compound in which R$^1$ is a trialkylammonio group may be obtained.

After completion of the reaction, the desired reaction product can be isolated and purified. For example, the crude product obtained from the reaction mixture is treated with an alkali metal hydroxide, followed by being passed through a column packed with a crosslinked dextran gel etc. to give the desired producted as an alkali metal salt thereof.

The polysulfate compound according to the present invention may be used either in a free form or in the of a pharmaceutically acceptable salt thereof. As such salts, there may be mentioned, for example, an alkali metal salt such as a sodium salt, a potassium salt and a lithium salt; an alkalline earth metal salt such as a calcium salt, a magnesium salt and a barium salt; an organic amine salt such as a trimethylamine salt, a trietylamine salt, a pyridine salt, a glycine ethyl ester salt, an ethanolamine salt and a basic amino acid salt; and so on.

The polysulfate compound or a salt thereof according to the present invention may be administered either orally or parenterally(e.g., intravenous, intramuscular topical and subcutaneous administrations), and may be used in an ordinary manner, e.g., as an optional pharmaceutical preparation such as a tablet, a granule, a capsule, a powder and an injectable preparation.

The dosage amount of the compound according to the present invention to be administered as an active ingredient is different depending upon the age, body weight, conditions and the kind of symptoms of a patient and may suitably be around 0.1 to 500 mg/kg, preferably around 0.1 to 50 mg/kg.

The starting compound(III) is a novel compound which can be prepared as follows. Namely, in cases where R is a $-OSO_2R^1$ group, the starting compound(III) can be obtained by subjecting a cyclodextrin to reaction with mesitylenesulfonyl chloride in a suitable solvent(e.g., pyridine) followed by isolation and purification in a conventional manner such as column chromatography and the like. In case where R is a $-SR^2$ group, the starting compound, a cyclodextrin sulfide derivative represented by Formula (III) can be prepared by subjecting a compound (III) in which R is a mesitylenesulfonyl group or an iodine atom to reaction with a mercaptan compound of the Formula $$R^2SH$$

In cases where R is a $-NHSO_2R^5$ group, the starting compound, a cyclodextrin sulfonamide derivative represented by Formula(III) can be prepared by subjecting a cyclodextrin to reaction with a substituted sulfonic acid halide(e.g., mesitylenesulfonyl chloride), optionally by reacting with ammonia after isolation and purification of the reaction product, followed by optional sulfonamidation of the product. Further, in cases where R is a $-NR^7COR^6$, the starting compound, an acylaminocylodetrin derivative represented by Formula(III) can be obtained by subjecting a cyclodextrin to reaction with a substituted sulfonic acid halide(e.g., mesitylenesulfonyl chloride and naphthylsufonyl chloride) and optionally after isolation and purification, reacting the product with ammonia or a loweralkylenediamine, followed by optional acylation of the resulting product.

The present invention will be explained in more detail by way of the following Examples, Referential Examples and Test Examples, which should not however be construed to limit the scope of the present invention.

EXAMPLE 1

To 1.0 g of heptakis(6-0-mesitylenesulfonyl)-β-cyclodextrin was added 50 ml of pyridine, and 2.77 g of sulfur trioxidepyridine complex was further added thereto. After reaction at 70° C. for 6 hours, the supernatant was removed and the residue was evaporated to dryness under reduced pressure. The obtained light brown powder was dissolved in 10 ml of a 30% sodium acetate solution, followed by purification on a column packed with Sephadex G-10 (trade name, manufactured by Pharmacia AB) to give 1 g of sodium salt of heptakis(6-0-mesitylenesulfonyl)-β-cyclodextrin polysulfate as a white powder.

IR $\nu_{max}^{Nujol}$cm$^{-1}$:1240, 1190, 1050, 1000, 820

$^1$H-NMR(D$_2$O)δ:2.25 (brs), 2.45 (brs), 6.9 (brs) The number of sulfate groups in the molecule to be calculated from the elementary analysis value: 10

EXAMPLES 2 to 4

An experiment was run in the same manner as in Example 1 except that mono(6-0-mesitylenesulfonyl)-β-cyclodextrin, bis(6-0-mesitylenesulfonyl)-β-cyclodextrin or tris(6-0-mesitylenesulfonyl)-β-cyclodextrin was reacted with sulfur trioxide-pyridine complex and that potassium acetate or potassium hydroxide was used in place of the sodium acetate to give the compound as shown in the following Table 1.

TABLE I

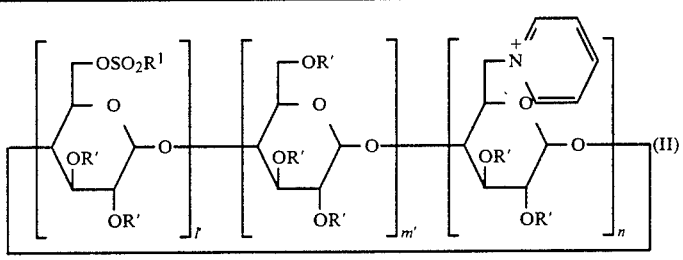

[Provided that $R^1$ is a mesityl group.]

| Example No. | Compound (VI) l' | m' | n | Number of sulfate group** | Kind of salt | Form | Yield (%)* | IR $\nu_{max}^{Nujol}$cm$^{-1}$ | $^1$H-NMR(D$_2$O)δ |
|---|---|---|---|---|---|---|---|---|---|
| 2 | 1 | 6 | 0 | 20 | K | Colorless powder | 171 | 1240, 1120, 1000, 810 | 2.35(brs), 2.64(brs), 7.20(brs) |
| 3 | 1 | 5 | 1 | 17 | K | Colorles powder | 161 | 1240, 1440, 1000, 940, 810 | 2.35(brs), 2.64(brs), 7.20(brs), 8.15(brs), 8.4–9.2(m) |

TABLE 1-continued

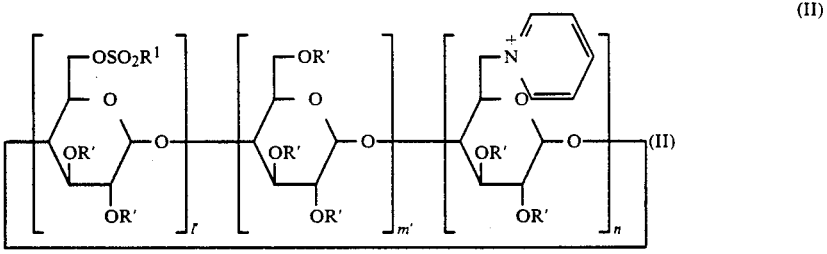

[Provided that R[1] is a mesityl group.]

| Example No. | Compound (VI) | | | | Physical properties etc. | | | |
|---|---|---|---|---|---|---|---|---|
| | l' | m' | n | Number of sulfate group** | Kind of salt | Form | Yield (%)* | IR $\nu_{max}^{Nujol}$cm$^{-1}$ | 1H-NMR(D$_2$O)δ |
| 4 | 1 | 4 | 2 | 16 | K | Colorless powder | 90 | 1240, 1040, 1000, 940, 810 | 2.35(brs), 2.60(brs), 7.20(brs), 8.15(brs), 8.5–9.3(m) |

Note)
*Yield is shown in terms of % by weight relative to the starting compound.
**The number of sulfate groups in the molecule to be calculated from the elementary analysis value.

EXAMPLE 5

To 25 ml of pyridine, was added 0.4 g of heptakis(6-benzylthio-6-deoxy)-β-cyclodextrin and 1.42 g of sulfur trioxide-pyridine complex was further added thereto, followed by stirring at 70° C. for 6 hours. After the reaction mixture was allowed to stand for cooling, the supernatant was removed. After the residue was evaporated to dryness under reduced pressure and dissolved in 5 ml of water, the pH of the solution was adjusted to 8 with a 10% sodium hydroxide, followed by purification on a column packed with Sephadex G-10 (trade name, manufactured by Pharmacia AB) to give 0.22 g of sodium salt of heptakis(6-benzilthio-6-deoxy)-β-cyclodextrin polysulfate as a light yellow powder.

IR $\nu_{max}^{Nujol}$cm$^{-1}$:1240, 1160, 1040, 830

1H-NMR(D$_2$O)δ:3.6 (br,s), 6.8–7.4 (br,s) The number of sulfate groups in the molecule to be calculated from the elementary analysis value: 12

EXAMPLES 6 to 17

The corresponding starting compounds were treated in the same manner as in Example 1 to give the compounds as listed in the following Table 2.

TABLE 2

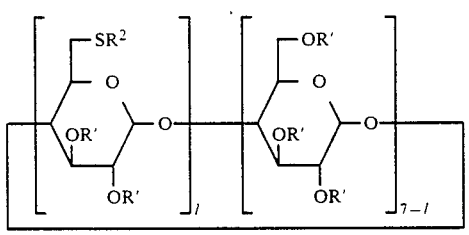

| Example No. | Compound (II) | | | | Physical properties etc. | | | |
|---|---|---|---|---|---|---|---|---|
| | R[2] | l | Number of sulfate group** | Kind of salt | Form | Yield (%)* | IR $\nu_{max}^{Nujol}$cm$^{-1}$ | 1H-NMR(D$_2$O)δ |
| 6 | —C$_6$H$_5$ | 7 | 7 | Na | Light brown powder | 106 | 1240, 1040, 830 | 6.5–7.4(br, s) |
| 7 | —(CH$_2$)$_4$CH$_3$ | 7 | 10 | Na | Light brown powder | 130 | 1240, 1040, 830 | 0.89(br, t)** 1.36(br, s) |
| 8 | —CH$_2$—C$_6$H$_5$ | 1 | 17 | K | Colorless powder | 178 | 1240, 1040, 810 | 7.2–7.3(m) |
| 9 | —CH$_2$—C$_6$H$_5$ | 2 | 16 | K | Colorless powder | 203 | 1240, 1040, 810 | 7.3–7.7(m) |
| 10 | —(CH$_2$)$_4$CH$_3$ | 3 | 15 | K | Colorless | 221 | 1240, 1040, | 7.1–7.6(m) |

TABLE 2-continued

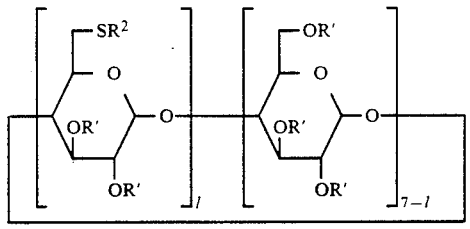
(II)

| Example No. | Compound (II) R² | l | Number of sulfate group** | Kind of salt | Physical properties etc. Form | Yield (%)* | IR $\nu_{max}^{Nujol}$cm$^{-1}$ | $^1$H-NMR(D$_2$O)δ |
|---|---|---|---|---|---|---|---|---|
| 11 | —(CH$_2$)$_4$CH$_3$ | 4 | 14 | K | Colorless powder | 87 | 1000, 820 1240, 1040, 1000, 820 | 7.0–7.6(m) |
| 12 | —(CH$_2$)$_4$CH$_3$ | 5 | 14 | K | Colorless powder | 72 | 1240, 1040, 1000, 820 | 7.0–7.6(m) |
| 13 | —(CH$_2$)$_{17}$CH$_3$ | 1 | 17 | K | Colorless powder | 173 | 1240, 1000, 810 | 0.86(br, m), 1.28(br, m) |
| 14 | triphenylmethyl (—C(C$_6$H$_5$)$_3$) | 1 | 19 | K | Light reddish brown powder | 191 | 1240, 1040, 810 | 7.25(br, s) |
| 15 | 2-methyl-4,6-dihydroxypyrimidinyl | 1 | 19 | K | Colorless powder | 214 | 1240, 1040, 810 | |
| 16 | pteridinyl | 1 | 17 | K | Colorless powder | 164 | 1240, 1000, 940, 800 | 8.40(br, s) 8.70(br, s) |
| 17 | pteridinyl | 2 | 14 | K | Colorless powder | 177 | 1240, 1040, 1000, 820 | 7.5–9.0(m) |

Note)
*Yield is shown in terms of % by weight relative to the starting compound.
**Values are at $^1$H-NMR(DMSO-d$_6$)δ.
***The number of sulfate groups in the molecule to be calculated from the elementary analysis value.

EXAMPLE 18

To 1 g of heptakis(6-benzoylamino-6 deoxy)-β-cyclodextrin was added 75 ml of pyridine and 3.6 g of sulfur trioxidepyridine complex was further added thereto. After reaction at 70° C. for 6 hours, the supernatant was removed and the residue was treated with methanol and ethanol for pulverization. The obtained powder was collected by filtration, dried and then dissolved in 5 ml of water. A 30% aqueous sodium acetate was added to the solution to give a sodium salt, followed by purification on a column packed with Sephadex G-10 (trade name, manufactured by Pharmacia AB) to give 0.87 g of sodium salt of heptakis(6-benzoylamino-6-deoxy)-β-cyclodextrin polysulfate as a light brown powder.

IR $\nu_{max}^{Nujol}$cm$^{-1}$:1640, 1600, 1240, 1040, 830
$^1$H-NMR(D$_2$O)δ:7.1–7.5 (br,s), 7.6–7.8 (br,s)
The number of sulfate groups in the molecule to be calculated from the elementary analysis values: 12

EXAMPLES 19 to 40

The corresponding compounds were treated in the same manner as in Example 18 to obtain the compounds as listed in the following Tables 3 and 4.

TABLE 3

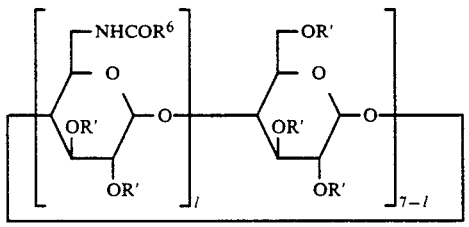

(II)

| Example No. | R⁶ | l | Number of sulfate group** | Salt | Form | Yield (%)* | IR $\nu_{max}^{Nujol}$cm⁻¹ | ¹H-NMR(D₂O)δ |
|---|---|---|---|---|---|---|---|---|
| 19 | —CH(CH₃)₂ | 7 | 13 | Na | Light brown powder | 60 | 1650, 1540, 1240, 1040, 830 | 1.1(d) |
| 20 | —(CH₂)₄CH₃ | 7 | 13 | Na | White powder | 69 | 1650, 1540, 1240, 1040, 830 | 0.82(br, t) 1.0–1.7(br, m), 2.0–2.3(br) |
| 21 | —(CH₂)₅CH₃ | 7 | 13 | Na | Light brown powder | 120 | 1650, 1550, 1240, 1040, 820 | 0.88(br, s), 1.3(br, s), 1.6(br, s), 2.25(br, s) |
| 22 | (thiophene) | 7 | 9 | Na | Light brown powder | 103 | 1640, 1540, 1240, 1040, 830 | 6.5–7.8(br, m) |
| 23 | (p-tolyl) —C₆H₄—CH₃ | 7 | 12 | Na | White powder | 60 | 1640, 1550, 1240, 1040, 840 | 1.6–2.3(br, m), 6.5–7.6(br, m) |
| 24 | (m-tolyl) | 7 | 12 | Na | Light brown powder | 105 | 1650, 1600, 1540, 1240, 1040, 830 | 1.6–2.2(br), 6.4–7.0(br) |
| 25 | —CH₂—C₆H₅ | 7 | 10 | Na | Brown powder | 40 | 1650, 1600, 1540, 1500, 1240, 1040, 830 | 7.1(br) |
| 26 | —C₆H₅ | 1 | 17 | K | White powder | 223 | 1640, 1550, 1240, 1160, 1050, 1000, 940, 880, 810 | 7.4–7.7(br, s), 7.7–7.9(br, s) |
| 27 | —(CH₂)₁₆CH₃ | 1 | 17 | K | White powder | 219 | 1640, 1550, 1240, 1000, 950, 810, 740, 620, 580 | 0.85(t), 1.27(s), 1.5–1.7(m), 2.2–2.5(m) |
| 28 | —(CH₂)₆CH₃ | 1 | 16 | K | White powder | 236 | 1640, 1550, 1240, 1000, 810, 740, 620, 580 | 0.7–1.0(m), 1.30(br, s), 1.5–1.8(m), 2.2–2.5(m) |
| 29 | —(CH₂)₄CH₃ | 1 | 17 | K | White powder | 238 | 1640, 1550, 1240, 1000, 940, 880, 810, 740, 690, 580 | 0.8–1.0(m), 1.1–1.4(m), 1.5–1.8(m), 2.1–2.5(m) |
| 30 | —(CH₂)₁₆CH₃ | 2 | 18 | K | White powder | 206 | 1640, 1550, 1240, 1160, 1040, 1000, | 0.8–1.2(m), 1.29(br, s) |

TABLE 3-continued (II)

$$\left[\begin{array}{c}-NHCOR^6\\ \phantom{x}\\ -OR'\\ OR'\end{array}\right]_l \left[\begin{array}{c}-OR'\\ \phantom{x}\\ -OR'\\ OR'\end{array}\right]_{7-l}$$

| Example No. | Compound (II) R⁶ | l | Number of sulfate group** | Salt | Form | Yield (%)* | IR $\nu_{max}^{Nujol}$ cm⁻¹ | ¹H-NMR(D₂O)δ |
|---|---|---|---|---|---|---|---|---|
| 31 | —(CH₂)₁₆CH₃ | 3.5*** | 17 | K | Light brown powder | 138 | 950, 810, 740, 580 1640, 1550, 1240, 1160, 1040, 1000, 945, 810, 740, 580 | 0.85(t) 1.23(br, s) |
| 32 | —(CH₂)₁₆CH₃ | 3.5*** | 15 | K | White powder | 186 | 1640, 1550, 1240, 1040, 1000, 820 | 0.87(br, s), 1.28(br, s), 1.4–1.7(m), 2.0–2.5(m) |
| 33 | —(CH₂)₄CH₃ | 3.5*** | 16 | K | White powder | 74 | 1640, 1550, 1240, 1160, 1040, 1000, 950, 810, 740, 580 | 0.87(br, s), 1.30(br, s), 1.59(br, s), 2.29(br, s) |
| 34 | 3,5-dihydroxyphenyl (—C₆H₃(OH)₂) | 1 | 17 | K | White powder | 235 | 1640, 1550, 1240, 1160, 1000, 940, 810, 740, 580 | 7.1–7.6(m) |
| 35 | 4-methoxyphenyl (—C₆H₄OCH₃) | 1 | 15 | K | White powder | 237 | 1640, 1510, 1240, 1000, 940, 880, 810, 740, 690, 620, 580 | 6.9–7.2(m), 7.7–7.9(m) |

Note)
*Yield is shown in terms of % by weight relative to the starting compound.
**The number of sulfate groups in the molecule to be calculated from the elementary analysis value.
***Mixture of compound (l = 3)/compound (l = 4) = 1:1

TABLE 4

(II)

$$\left[\begin{array}{c}R^7\\ |\\ -NCOR^6\\ -OR'\\ OR'\end{array}\right]_l \left[\begin{array}{c}-OR'\\ \phantom{x}\\ -OR'\\ OR'\end{array}\right]_{7-l}$$

| Example No. | Compound (II) R⁶ and R⁷ | l | Number of sulfate group** | Kind of salt | Form | Yield (%)* | IR $\nu_{max}^{Nujol}$ cm⁻¹ | ¹H-NMR(D₂O)δ |
|---|---|---|---|---|---|---|---|---|
| 36 | R⁶: —CH₃ R⁷: —CH₂CH₂NHCOCH₂ | 1 | 16 | K | Light brown powder | 224 | 1640, 1550, 1240, 1040, 1000, 940, 810, 740, 620, 580 | 1.7–2.3(m) |
| 37 | R⁶: —CH₃ R⁷: —CH₂CH₂NHCOCH₂ | 3 | 13 | K | White powder | 191 | 1640, 1550, 1430, 1240, 1040, 1000, 940, 810, 740, 620, 580 | 1.99(br, s) 2.18(br, s), |

TABLE 4-continued

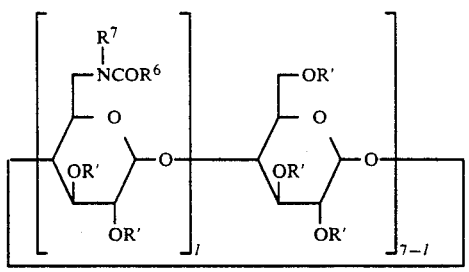

(II)

| Example No. | Compound (II) R⁶ and R⁷ | l | Number of sulfate group** | Kind of salt | Physical property value etc. Form | Yield (%)* | IR $\nu_{max}^{Nujol}$cm$^{-1}$ | $^1$H-NMR(D$_2$O)δ |
|---|---|---|---|---|---|---|---|---|
| 38 | R⁶: —C₆H₅<br>R⁷: —CH₂CH₂NHCO—C₆H₅ | 1 | 16 | K | Light brown powder | 235 | 1640, 1550, 1240, 1040, 1000, 940, 880, 810, 740, 690, 580 | 7.1–8.0(m) |
| 39 | R⁶: —C₆H₅<br>R⁷: —CH₂CH₂NHCO—C₆H₅ | 2 | 15 | K | White powder | 194 | 1640, 1550, 1240, 1040, 1000, 940, 810, 740, 620, 580 | 6.8–8.0(br) |
| 40 | R⁶: —C₆H₅<br>R⁷: —CH₂CH₂NHCO—C₆H₅ | 3 | 15 | K | White powder | 189 | 1630, 1550, 1430, 1240, 1160, 1040, 1000, 940, 810, 740, 620, 580 | 7.47(br, s) |

Note
*Yield is shown in terms of % by weight relative to the starting compound.
**The number of sulfate groups in the molecule to be calculated from the elementary analysis value.

EXAMPLE 41

0.5 g of heptakis(6-benzenesulfonylamino-6-deoxy)-β-cyclodextrin was added 30 ml of pyridine, and then 1.6 g of sulfur trioxide-pyridine complex was added thereto, followed by stirring at 70° C. for 6 hours. After completion of the reaction, the supernatant was removed, and the residue was washed successively with methanol and ethanol to give a powder. The powder was collected by filtration and dried to obtain a brown powder. The powder was dissolved in 3 ml of water, and the pH of the solution was adjusted to 8 with a 10% aqueous sodium hydroxide, followed by purification on a crosslinked dextran gel: Sephadex G-10 column (trade name, manufactured by Pharmacia AB) to give 0.7 g of sodium salt of heptakis(6-benzenesulfonylamino-6-deoxy)-β-cyclodextrin.polysulfate as a white powder.

Yield = 140% (in terms of wt % of the desired product relative to the starting compound. The same applies also in Examples 42 to 54.)
IR $\nu_{max}^{Nujol}$cm$^{-1}$    1240, 1160, 1050, 830
$^1$H-NMR(D$_2$O)δ    7.0–8.2(br, s)

The number of sulfate groups in the molecule to be calculated from the elementary analysis value: 11.

EXAMPLE 42

In 85 ml of pyridine was dissolved 0.83 g of mono(6-benzenesulfonylamino-6-deoxy)-β-cyclodextrin with heating at 100° C., and 6.2 g of sulfur trioxide-pyridine complex was added thereto with stirring well, followed by stirring at 100° C. for 6 hours. The pyridine was removed by evaporation, and the residue was dissolved in 20 ml of water and 40 ml of methanol, followed by further addition of 300 ml of methanol. The resulting mixture was allowed to stand overnight at a cool place, and the precipitates thus formed were collected by filtration, washed with methanol and dissolved in water. The resulting solution was concentrated to evaporate the methanol contained therein. Water and 50 ml of a strongly acidic ion exchange resin S-1B(H⁺) (trade name, manufactured by Mitsubishi Kasei Corporation) were added to the residue, and the resulting mixture was stirred at room temperature for 30 minutes. The resin was removed by filtration from the mixture, and after the pH of the filtrate was adjusted to 7.3 with 1.7N potassium hydroxide, the filtrate was filtered through a membrane filter, followed by freeze drying to give 2.0 g of potassium salt of mono(6-benzenesulfonylamino-6-deoxy)-β-cyclodextrin.polysulfate as a white powder.

| | |
|---|---|
| Yield: 241% | |
| IR $\nu_{max}^{KBr}$cm$^{-1}$ | 1640, 1240, 1160, 1000, 940, 810 |
| $^1$H-NMR(D$_2$O)δ | 7.6–8.1(m) |

The number of sulfate groups in the molecule to be calculated from the elementary analysis value: 19

EXAMPLES 43 to 54

The corresponding starting compounds were treated in the same manner as in Example 41 or 42 to obtain the compounds as listed in the following Table 5.

TABLE 5

(II)

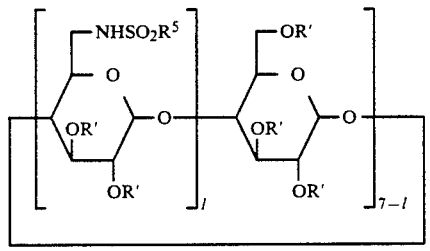

| Example No. | R$^5$ | Compound (II) $l$ | Number of sulfate group* | Kind of salt | Form | Yield (%) | IR $\nu_{max}^{Nujol}$ cm$^{-1}$ | $^1$H—NMR (D$_2$O) δ |
|---|---|---|---|---|---|---|---|---|
| 43 | 2-naphthyl | 2 | 15 | K | Colorless Powder | 180 | 1640, 1240, 1160, 1000, 940, 810 | 7.1–8.7 (br,m) |
| 44 | 2-naphthyl | 1 | " | " | " | 233 | 1640, 1240, 1060, 1040, 1000, 940, 810 | 7.4–8.7 (br,m) |
| 45 | 2-naphthyl | 3.5** | " | " | " | 167 | 1640, 1240, 1160, 1040, 1000, 820 | 6.5–8.7 (br,m) |
| 46 | phenyl | " | 14 | " | " | 186 | 1640, 1240, 1000, 810 | 7.3–8.0 (br,m) |
| 47 | 4-CH$_3$-phenyl | 7 | 11 | Na | Light brown powder | 113 | 1240, 1160, 1040, 820 | 2.25 (br,s), 6.8–8.0 (br) |
| 48 | 4-OCH$_3$-phenyl | " | 8 | " | Grayish powder | 80 | 1600, 1240, 1160, 1040, 830 | 6.7–7.3 (br,m), 7.4–8.0 (br,m) |
| 49 | 4-Cl-phenyl | 7 | 9 | Na | Light brown powder | 96 | 1240, 1160, 1040, 830 | 7.0–7.9 (br) |
| 50 | 2-thienyl | " | 10 | " | " | 133 | 1400, 1240, 1160, 1040, 830 | 7.1 (br), 7.6 (br,s), 7.8 (br) |
| 51 | 3,5-dimethylisoxazol-4-yl | " | 10 | " | " | 145 | 1590, 1260, 1050, 830 | 2.3 (br,s), 2.6 (br,s) |

TABLE 5-continued

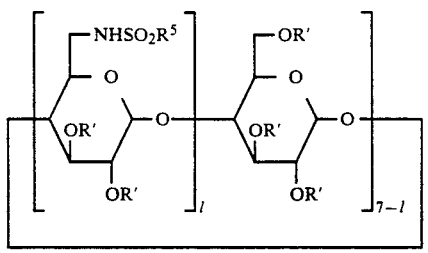

(II)

| Example No. | $R^5$ | Compound (II) l | Number of sulfate group* | Kind of salt | Form | Yield (%) | IR $\nu_{max}^{Nujol}$ cm$^{-1}$ | $^1$H—NMR (D$_2$O) δ |
|---|---|---|---|---|---|---|---|---|
| 52 | H$_3$C—N=C(S)—CH$_3$ | " | 8 | " | " | 80 | 1520, 1240, 1050, 830 | 2.45 (s), 2.6 (br,s) |
| 53 | —(CH$_2$)$_7$CH$_3$ | " | 12 | " | " | 90 | 1240, 1150, 1040, 830 | 0.91 (brs), 1.38 (brs), 1.85 (br) |
| 54 | —(CH$_2$)$_7$CH$_3$ | 1 | 15 | K | Colorless powder | 236 | 1240, 1000, 940, 810 | 0.7–1.1 (br,m), 1.3 (br,s) |

Note)
*The number of sulfate groups in the molecule to be calculated from the elementary analysis value.
**Mixture of compound (l = 3)/compound (l = 4 = 1:1

EXAMPLE 55

To 0.9 g of heptakis(6-benzylamino-6-deoxy)-β-cyclodestrin was added 60 ml of pyridine, and then 5.13 g of sulfur trioxide-pyridine complex was added thereto, followed by reaction at 70° C. for 6 hours. The supernatant was removed from the reaction mixture, and the residue was treated with methanol to give a powder. The powder was collected by filtration, dried and then dissolved in 10 ml of water. After the pH of the resulting solution was adjusted to 8 with a 10% aqueous sodium hydroxide, the solution was purified on a column packed with Sephadex G-10 (trade name, manufactured by Pharmacia AB) to give 1.17 g of sodium salt of heptakis(6-benzylamino-6-deoxy)-β-cyclodextrin polysulfate as a light brown powder.

IR $\nu_{max}^{Nujol}$cm$^{-1}$:1240, 1040, 830
$^1$H—NMR(D$_2$O)δ:7.35 (br, s)
The number of sulfate groups in the molecule to be calculated from the elementary analysis valve: 14

EXAMPLES 56 to 66

The corresponding starting compounds were treated in the same manner as in Example 55 to obtain the compounds as listed in the following Table 6.

TABLE 6

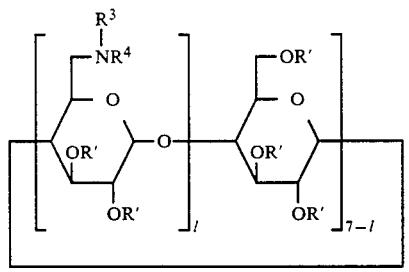

(II)

| Example No. | —N(R$^4$)(R$^3$) | Compound (III) l | Number of sulfate group** | Kind of salt | Form | Yield (%)* | IR $\nu_{max}^{Nujol}$ cm$^{-1}$ | $^1$H-NMR(D$_2$O)δ |
|---|---|---|---|---|---|---|---|---|
| 56 | —N(CH$_3$)—CH$_3$ | 7 | 12 | Na | Light brown powder | 120 | 1240, 1040, 820 | 3.0 (br,s) |
| 57 | —N(H)—CH$_2$CH$_2$OH | " | 20 | " | Light yellow powder | 140 | 1240, 1000, 830 | 3.0–3.4 (br) 4.0–5.6 (br,m) |

TABLE 6-continued

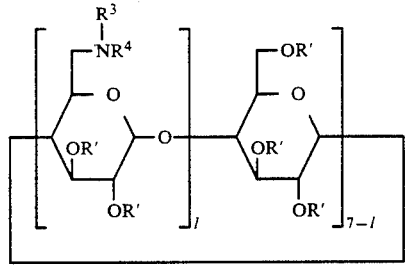
(II)

| Example No. | Compound (III) $-N\overset{R^4}{\underset{R^3}{\diagdown}}$ | l | Number of sulfate group** | Kind of salt | Form | Yield (%)* | Physical properties etc. IR $\nu_{max}^{Nujol}$ cm$^{-1}$ | $^1$H-NMR(D$_2$O)δ |
|---|---|---|---|---|---|---|---|---|
| 58 | $-N\overset{H}{\underset{CH_2CHCH_2OH}{\diagdown}}$ (with OH on middle C) | " | 18 | " | Brown powder | 150 | 1250, 1040, 820 | 2.8–5.6 (br) |
| 59 | piperidinyl (N-cyclohexyl) | " | 12 | — | Light brown powder | 83 | 1240, 1040, 820 | 1.4–2.1 (br,s), 2.1–2.6 (br,m) |
| 60 | $-N\overset{H}{\diagdown}CH_2-C_6H_5$ | 7 | 14 | Na | Light brown powder | 100 | 1240, 1040, 820 | 1.0–2.5 (br,m) |
| 61 | $-N\overset{H}{\diagdown}-C_6H_5$ | " | 14 | " | Brown powder | 100 | 1240, 1040, 830 | 6.2–7.4 (br,m) |
| 62 | $-N\overset{H}{\diagdown}CH_2CH_2-C_6H_5$ | " | 14 | " | Grayish powder | 90 | 1240, 1040, 830 | 7.2 (br,s) |
| 63 | $-N\overset{CH_3}{\diagdown}CH_2CH_2-C_6H_5$ | " | 14 | " | Light yellow powder | 114 | 1240, 1040, 820 | 2.1 (br,s), 7.2 (br,s) |
| 64 | $-N\overset{H}{\diagdown}CH_2-C_6H_5$ | 1 | 13 | K | Colorless powder | 144 | 1240, 1040, 820 | 7.5 (br,s) |
| 65 | " | 2 | 17 | " | " | 226 | 1240, 1040, 1000, 810 | 7.5 (br,s) |
| 66 | $-N\overset{H}{\diagdown}-C_6H_4-OCH_3$ | 7 | 13 | Na | Light brown powder | 66.7 | 1240, 1040, 830 | 3.0–5.5 (br,m), 3.6 (s), 6.2–7.8 (m) |

Note)
*Yield is shown in terms of % by weight relative to the starting compound.
**The number of sulfate groups in the molecule to be calculated from the elementary analysis value.

EXAMPLES 67 to 84

The corresponding starting compounds were treated in the same manner as in Example 1 or Example 42 to give the compounds as listed in the following Table 7.

TABLE 7

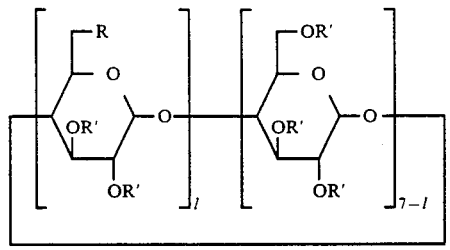
(II)

| Example No. | Compound (II) R | l | Number of sulfate group** | Kind of salt | Form | Yield (%) | IR $\nu_{max}^{Nujol}$ cm$^{-1}$ | $^1$H—NMR (D$_2$O) δ |
|---|---|---|---|---|---|---|---|---|
| 67 | —S—CH$_2$—⟨⟩—Cl | 3 | 18 | K | Colorless powder | 160 | 1640, 1493, 1250, 1145, 1041, 950, 826 | 6.5–7.5 (m) |
| 68 | —S—CH$_2$—⟨⟩—OMe | 3 | 18 | K | " | 212 | 1640, 1510, 1240, 1160, 1030, 945, 822 | 3.74 (s), 6.5–7.1 (m), 7.1–7.5 (m) |
| 69 | —S—CH$_2$—⟨⟩—OMe | 7 | 9 | Na | Faintly yellow powder | 80 | 1620, 1510, 1250, 1150, 1040, 830 | 3.7 (br), 6.6–7.5 (br) |
| 70 | —S—⟨⟩—Cl | 7 | 11 | Na | Faintly brown powder | 93 | 1640, 1240, 1040, 820 | 7.0 (br,s) |
| 71 | —S—⟨⟩—Me | 7 | 14 | Na | Faintly brown powder | 116 | 1640, 1500, 1240, 1040, 840 | 2.1 (br,s), 6.95 (br,s) |
| 72 | —S—⟨⟩—OMe | 7 | 12 | Na | Faintly brown powder | 67 | 1650, 1600, 1500, 1240, 1040, 830 | 3.6 (br,s), 6.2–7.6 (br,s) |
| 73 | —NHCH$_2$CH$_2$NH$_2$ | 1 | 15 | Na | Colorless powder | 186 | 1240, 1050, 820 | 3.1–5.6 (m) |
| 74 | —NH—⟨⟩—Cl | 7 | 11 | Na | Brown powder | 36.4 | 1630, 1600, 1500, 1240, 1040, 820 | 6.0–7.0 (br,m) |
| 75 | —NH—⟨⟩—CH$_3$ | 7 | 12 | Na | Faintly brown powder | 43 | 1630, 1510, 1240, 1040, 820 | 2.0–2.6 (br,s), 6.6–7.8 (br) |
| 76 | —NH—⟨⟩—OMe | 1 | 16 | Na | Faintly brown powder | 167 | 1640, 1515, 1240, 1160, 1040, 1000, 940, 880, 820 | 3.85 (br,s), 6.7–7.3 (m) |
| 77 | —NH—⟨⟩—OMe | 3 | 14 | K | Faintly brown powder | 138 | 1640, 1515, 1240, 1140, 1020, 940, 820 | 3.78 (br,s), 6.2–7.1 (m) |
| 78 | —NH—CH$_2$—⟨⟩—OCH$_3$ | 7 | 16 | Na | Faintly brown powder | 150 | 1640, 1610, 1510, 1240, 1000, 820 | 2.5 (br), 6.5–7.7 (br) |
| 79 | —NH—⟨⟩(OCH$_3$)$_2$ | 7 | 14 | Na | Brown powder | 60 | 1620, 1520, 1230, 1040, 820 | 3.7 (br), 6.0–7.2 (m) |
| 80 | —NH—⟨⟩(OCH$_3$)$_3$ | 7 | 13 | Na | Faintly blackish brown powder | 70 | 1610, 1510, 1240, 1040, 820 | 3.45 (br), 5.9 (br) |
| 81 | —NHSO$_2$—⟨⟩ | 7 | 12 | Na | Brown powder | 103 | 1640, 1240, 1050, 830 | 7.6 (br,s) |

TABLE 7-continued

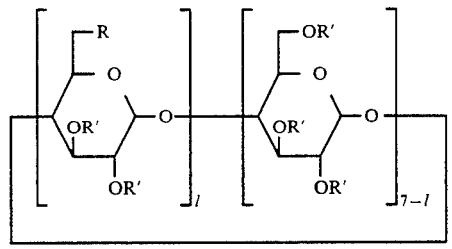
(II)

| Example No. | R | Compound (II) l | Number of sulfate group** | Kind of salt | Form | Yield (%) | IR $\nu_{max}^{Nujol}$ cm$^{-1}$ | $^1$H—NMR (D$_2$O) δ |
|---|---|---|---|---|---|---|---|---|
| 82 | —NHSO$_4$—(2,4,6-trimethylphenyl) | 7 | 11 | Na | Faintly brown powder | 96.7 | 1650, 1600, 1240, 1040, 830 | 2.0–2.7 (br,s), 6.6–7.1 (br,s) |
| 83 | —NHCO—(C$_6$H$_4$)—OMe | 7 | 12 | Na | Faintly brown powder | 133 | 1650, 1610, 1500, 1260, 1040, 840 | 3.5 (s), 6.5 (br,s), 7.4 (br,s) |
| 84 | —NHCO-CH$_2$CH$_2$-CO-(pyrenyl) | 2 | 16 | K | Faintly yellow powder | 192 | 1650, 1550, 1240, 1040, 940, 820 | 2.5–3.0 (m), 7.0–8.5 (m) |

EXAMPLES 85 to 88

Each of tris(6-benzylthio-6-deoxy)-γ-cyclodextrin and octakis(6-benzylthio-6-deoxy)-γ-cyclodextrin which were obtained in Referential Example 80 was treated in the same manner as in Example 5 to obtain the compounds as listed in the following Table 8.

TABLE 8

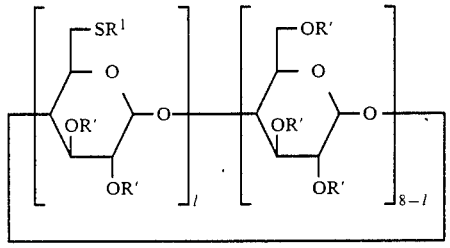
(I)

| Example No. | R$^1$ | Compound (I) l | Number of sulfate group | Kind of salt | Form | Yield (%) | IR $\nu_{max}^{Nujol}$ cm$^{-1}$ | $^1$H—NMR (D$_2$O) δ |
|---|---|---|---|---|---|---|---|---|
| 85* | —CH$_2$—(phenyl) | 3 | 19 | K | Colorless powder | 225 | 1240, 1040, 1000, 940, 810 | 7.39 (br,s) |
| 86* | —CH$_2$—(phenyl) | 3 | 19 | K | " | 230 | 1240, 1040, 1000, 940, 810 | 7.37 (br,s) |
| 87* | —CH$_2$—(phenyl) | 3 | 19 | K | " | 225 | 1240, 1040, 1000, 940, 815 | 7.38 (br,s) |

TABLE 8-continued

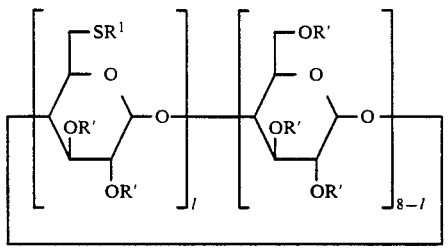

(I)

| | Compound (I) | | | | | Physical properties etc. | |
|---|---|---|---|---|---|---|---|
| Example No. | $R^1$ | Number of sulfate group | l | Kind of salt | Form | Yield (%) | IR $\nu_{max}^{Nujol}$ cm$^{-1}$ | $^1$H—NMR (D$_2$O) δ |
| 88 | —CH$_2$—⟨phenyl⟩ | 8 | 14 | K | " | 79 | 1240, 1035, 980, 825 | 6.0–7.2 (m) |

Note) *regio isomers

EXAMPLE 89

Hexakis(6-p-tolylthio-6-deoxy)-α-cyclodextrin was treated in the same manner as in Example 5 to give sodium salt of hexakis(6-p-tolylthio-6-deoxy)-α-cyclodextrin polysulfate as a white powder.

Yield = 126%

IR $\nu_{max}^{Nujol}$ cm$^{-1}$: 1240, 1040, 830

$^1$H-NMR (D$_2$O)δ: 2.0 (br.s), 6.5–7.2 (br)

The number of sulfate groups in the molecule to be calculated from the elementary analysis values; 10

EXAMPLE 90

Hexakis[6-(2-thenoylamino)-6-deoxy]-α-cyclodextrin was treated in the same manner as in Example 18 to give sodium salt of hexakis[6-(2-thenoylamino)-6-deoxyl-α-cyclodextrin polysulfate as a white powder.

Yield = 77.5%

IR $\nu_{max}^{Nujol}$ cm$^{-1}$: 1630, 1550, 1240, 1040, 1000, 830

$^1$H-NMR (D$_2$O)δ: 6.7(br), 7.4(br)

The number of sulfate groups in the molecule to be calculated from the elementary analysis values; 10

REFERENTIAL EXAMPLE 1

(1) In 2.5 l of pyridine was dissolved 126 g of β-cyclodextrin, and 30 g of mesitylenesulfonyl chloride was added thereto portionwise at 25° C., followed by stirring for 2 hours. Further, 6 g of mesitylenesulfonyl chloride was added thereto and the resulting mixture was stirred for 1 hour. After water was added to the resulting mixture and the mixture was allowed to stand overnight, the solvent was removed by evaporation and the residue was dissolved in 1 l of water. The resulting solution was applied onto a column packed with CHP-20 RESIN (trade name, manufactured by Mitsubishi Kasei Corporation), and the column was washed successively with 10 l of water, 3 l of a 10% aqueous methanol and 3 l of a 20% aqueous methanol, and then 3 l of a 50% aqueous methanol was passed through the column to collect an eluate. Then, in a similar manner, 3 l of a 80% aqueous methanol and 3 l of methanol were successively passed through the column to collect respective eluates, from which the solvents were removed by evaporation and further evaporated to dryness under reduced pressure to give the following compounds i) to iii).

i) mono(6-0-mesitylenesulfonyl)-β-cyclodextrin
Yield = 52.6 g (40%)
White powder
IR $\nu_{max}^{Nujol}$ cm$^{-1}$   1160, 1080, 1030
$^1$H-NMR(DMSO-d$_6$)δ   2.29(s, 3H), 2.54(s, 6H), 2.7–4.6(m, 48H), 4.6–4.9(m, 7H), 5.70(brs, 14H), 7.10(s, 2H)

ii) bis(6-0-mesitylenesulfonyl)-β-cyclodextrin
Yield = 13.0 g (8.7%)
White powder
IR $\nu_{max}^{KBr}$ cm$^{-1}$   1610, 1355, 1160, 1030
$^1$H-NMR(DMSO-d$_6$)δ   2.29(s, 6H), 2.52(s, 12H), 3.1–4.6(m, 47H), 4.74(brs, 4H), 4.84(brs, 3H), 5.6–5.9(m, 14H), 7.07(s, 2H), 7.10(s, 2H)

iii) tris(6-0-mesitylenesulfonyl)-β-cyclodextrin
Yield = 1.0 g
White powder
IR $\nu_{max}^{KBr}$ cm$^{-1}$   1610, 1355, 1190, 1175, 1150, 1030
$^1$H-NMR(DMSO-d$_6$)δ   2.2–2.4(m, 9H), 2.4–2.7(m, 18H), 3.0–5.0(m, 53H), 5.6–6.0(m, 14H), 7.0–7.3(m, 6H)

REFERENTIAL EXAMPLE 2

(1)-a In a sealed tube were stirred 26.4 g of mono(6-0-mesitylenesulfonyl)-β-cyclodextrin and 350 ml of a 10% ammonia in methanol at 70° C. for 3 days. After cooling of the mixture, the crystals formed were collected by filtration and dried to give 18.1 g of mono(6-amino-6-deoxy)-β-cyclodextrin as a white powder.

Yield = 79.8%
m.p. 262° C. (dec.)
IR $\nu_{max}^{KBr}$ cm$^{-1}$   3300, 1638, 1158, 1080, 1030

(1)-b Bis-(6-0-mesitylenesulfonyl)-β-cyclodextrin was treated in the same manner as in (1)-a to give bis(6-amino-6-deoxy)-β-cyclodextrin.

Yield = 71%
m.p. 245° C. (dec.)

| | |
|---|---|
| IR $\nu_{max}^{KBr}$cm$^{-1}$ | 3300, 1630, 1158, 1080, 1030 |

(2)-a In 10 ml of water and 10 ml of tetrahydrofuran was suspended 1.13 g of the product obtained in (1)-a, and then 0.1 g of sodium hydrogencarbonate and 0.21 g of benzenesulfonyl chloride were added thereto, followed by stirring overnight at room temperature. After concentration, the reaction mixture was cooled with ice water to effect precipitation. The crystals precipitated were collected by filtration and washed successively with water and acetone, followed by drying to give 1.0 g of mono(6-benzenesulfonylamino-6-deoxy)-β-cyclodextrin as a white powder.

| | |
|---|---|
| Yield: 78.5% | |
| m.p. 233–236° C. (dec.) | |
| $^1$H-NMR(DMSO-d$_6$)δ | 4.3–4.6(m, 6H), 4.7–5.0(m, 7H), 5.6–5.9(m, 14H), 7.4–7.7(m, 3H), 7.7–7.9(m, 2H) |

(2)-b The product obtained in (1)-b and naphthalenesulfonyl chloride were treated in the same manner as in (2)-a to give bis(6-naphthalenesulfonylamino-6-deoxy)-β-cyclodextrin as a white powder.

Yield: 70%

$^1$H-NMR(DMSO-d$_6$)δ:4.4–5.0 (m), 5.0–6.2 (m), 7.5–8.6 (m)

REFERENTIAL EXAMPLE 3

To a solution of 56.8 g of β-cyclodextrin in 600 ml of pyridine stirred on a 60° C. hot water bath was added dropwise a solution of 43.7 g of mesitylenesulfonyl chloride in 100 ml of pyridine over 3 hours, and the resulting mixture was further stirred for 2 hours. After the solvent was evaporated from the reaction mixture, the residue was dissolved in 200 ml of methanol, and 300 ml of water was added thereto. Then, the resulting solution was cooled with ice water, and after the supernatant was removed, the residue was treated with acetone for pulverization. After the resulting powder was collected by filtration and dried, separation and purification were carried out by silica gel column chromatography to give the following compounds i), ii) and iii).

| | |
|---|---|
| i) tris(6-0-mesitylenesulfonyl)-β-cyclodextrin | |
| Yield = 7.0 g | |
| White powder | |
| IR $\nu_{max}^{KBr}$cm$^{-1}$ | 3400, 2850, 1610, 1350, 1190, 1175, 1155, 1080, 1030 |
| $^1$H-NMR(DMSO-d$_6$)δ | 2.2–2.4(m, 9H), 2.4–2.7(m, 18H), 3.0–5.0(br, 53H), 5.6–6.0(m, 14H), 7.0–7.3(m, 6H) |
| ii) tetrakis(6-0-mesitylenesulfonyl)-β-cyclodextrin | |
| Yield = 3.0 g | |
| White powder | |
| IR $\nu_{max}^{KBr}$cm$^{-1}$ | 3400, 2850, 1610, 1355, 1190, 1170, 1080, 1055 |
| $^1$H-NMR(DMSO-d$_6$)δ | 2.27(br, s, 12H), 2.4–2.7(m, 24H), 3.0–5.0(m, 52H), 5.6–6.1(m, 14H), 6.9–7.2(m, 8H) |
| iii) pentakis(6-0-mesitylenesulfonyl)-β-cyclodextrin | |
| Yield = 1.30 g | |
| White powder | |
| IR $\nu_{max}^{KBr}$cm$^{-1}$ | 3400, 2850, 1610, 1355, 1190, 1175, 1080, 1055 |
| $^1$H-NMR(DMSO-d$_6$)δ | 2.26(br, s, 15H), 2.3–2.7(m, 30H), 3.0–5.0(m, 51H), 5.6–6.1(m, 14H), 6.8–7.2(m, 10H) |

REFERENTIAL EXAMPLE 4

To a solution of 0.69 g of benzylmercaptan in 20 ml of dimethylformamide was added 0.22 g of sodium hydride (content 62%) with stirring and ice-cooling, and 1 g of heptakis(6-iodo-6-deoxy)-β-cyclodextrin was added thereto. To effect reaction the mixture was stirred overnight in an argon gas stream at room temperature. The reaction mixture was poured into 200 ml of water, and the precipitate thus formed was collected by filtration, washed and then dried to give 0.95 g of heptakis(6-benzylthio-6-deoxy)-β-cyclodextrin as a yellow powder.

$^1$H-NMR(DMSO-d$_6$)δ:4.9 (br,s), 5.82 (br,s), 7.17 (br,s)

REFERENTIAL EXAMPLE 5

To a suspension of 1.2 g of sodium hydride (content 62%) in 130 ml of dimethylformamide was added dropwise 3.5 ml of benzylmercaptan, and after 30 minutes 13.2 g of mono(6-0-mesitylenesulfonyl)-β-cyclodextrin was added thereto, followed by stirring at 80° C. for 8 hours. After cooling, the reaction mixture was poured into 600 ml of acetone, and the precipitate thus formed was collected by filtration and then dried to give 9.84 g of mono(6-benzylthio-6-deoxy)-β-cyclodextrin as a colorless powder.

$^1$H-NMR(DMSO-d$_6$)δ:4.83 (br,s), 5.73 (br,s), 7.2–7.4 (m)

REFERENTIAL EXAMPLES 6 to 16

The corresponding starting compounds were treated in the same manner as in Referential Example 5 to obtain the compounds as listed in the following Table 9.

TABLE 9

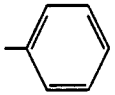

(III)

| Referential Example No. | Compound (III) R² | l | Form | Yield (%)* | ¹H-NMR (DMSO-$d_6$) |
|---|---|---|---|---|---|
| 6 | (phenyl) | 7 | Yellow powder | 95.5 | 4.95(br, s), 5.92(br, s) 7.0–7.3(br, s) |
| 7 | —(CH₂)₄CH₃ | 7 | Light brown powder | 76 | 0.86(br, s), 1.35(br, s) 2.54(br, s), 4.9(br, s) 5.82(br, s) |
| 8 | —CH₂—(phenyl) | 2 | Colorless powder | 82 | 4.85(br, s), 5.6–6.0(m) 7.1–7.4(m) |
| 9 | " | 3 | Colorless powder | 72 | 3.0–4.0(m), 4.4–4.7(m), 4.8–5.0(m), 5.6–6.0(m) 7.1–7.3(m) |
| 10 | —CH₂—(phenyl) | 4 | Colorless powder | 51 | 2.5–4.0(m), 4.4–4.7(m) 4.87(br, s), 5.5–6.0(m) 7.0–7.4(m) |
| 11 | " | 5 | Colorless powder | 50 | 2.5–4.0(m), 4.5–4.8(m) 4.89(br, s), 5.6–6.0(m) 7.1–7.4(m) |
| 12 | —(CH₂)₁₇CH₃ | 1 | Colorless powder | 70 | 0.86(t), 1.24(S), 1.4–1.6(m), 4.7–4.9(m), 5.6–5.9(m) |
| 13 | —C(ph)₃ | " | Light reddish brown powder | 40 | 4.6–4.9(m), 5.2–6.0(m), 7.27(S) |
| 14 | (pyrimidine-diol) | " | Colorless powder | 41 | 3.2–4.0(m), 4.4–4.7(m), 4.8–5.2(m), 5.6–6.0(m) |
| 15 | (purine) | " | Colorless powder | 78 | 3.1–4.0(m), 4.3–4.6(m), 4.7–4.9(m), 4.96(d), 5.6–5.9(d), 5.95(d) |
| 16 | " | 2 | Colorless powder | 48 | 3.0–4.6(m), 4.6–5.2(m) 5.3–6.5(m), 8.3–8.9(m) |

Note)
*Yield is shown in terms of % by weight relative to the starting compound.

REFERENTIAL EXAMPLE 17

To 1 g of heptakis(6-amino-6-deoxy)-β-cyclodextrin were added 30 ml of methanol and 1.7 g of benzoic anhydride, and the mixture was refluxed by heating for 18 hours. The reaction mixture was evaporated to dryness under reduced pressure, and ethyl ether was added to the residue. The insolubles were collected by filtration and dried, followed by separation and purification by silica gel column chromatography to give 1 g of heptakis(6-benzoylamino-6-deoxy)-β-cyclodextrin as a white powder.

Yield=61%

$^1$H-NMR(DMSO-d$_6$)δ:4.96 (d), 7.0–7.8 (m), 7.9–8.2 (br,m)

REFERENTIAL EXAMPLE 18

To 1 g of heptakis(6-amino-6-deoxy)-β-cyclodextrin was added 60 ml of a 10% aqueous sodium hydrogencarbonate solution, and 1.4 g of 2-thenoyl chloride was further added dropwise thereto. After the mixture was vigorously stirred at room temperature for 3 days, the precipitate thus formed was collected by filtration, washed and dried, followed by separation and purification by silica gel column chromatography to give 0.6 g of heptakis[6-(2-thenoylamino)-6-deoxy]-β-cyclodextrin as a white powder.

Yield=59%

$^1$H-NMR(DMSO-d$_6$)δ:3.1–4.0 (br,m), 5.0 (br,s), 5.9 (br,s), 5.95 (br,s), 6.86 (dd), 7.55 (d), 7.70 (d), 8.10 (br,s)

REFERENTIAL EXAMPLE 19

In 20 ml of methanol was suspended 2.27 g of mono(6-amino-6-deoxy)-β-cyclodextrin, and then 1.38 g of 3,5-diacetoxybenzoic anhydride was added thereto, followed by refluxing with heating for 8 hours. After the mixture was cooled, 20 ml of conc. ammonia water was added thereto, and the mixture was stirred at room temperature overnight. The solvent was removed by evaporation, and after the residue was washed, the crude product was collected by filtration and dissolved in water. The resulting solution was passed through a column packed with a CHP-20 RESIN (trade name; manufactured by Mitsubishi Kasei Corporation). The column was washed successively with 500 ml of water and 500 ml of a 10% aqueous methanol, and then a 50% aqueous methanol was passed through the column to collect the eluate. The solvent was evaporated off, and the residue was washed and then dried to give 2.22 g of mono[6-deoxy-6-(3,5-dihydroxybenzoylamino)]-β-cyclodextrin as a white powder.

Yield=87%

$^1$H-NMR(DMSO-d$_6$)δ:4.3–4.6 (m), 4.7–5.0 (m), 5.5–5.9 (m), 6.34 (t), 6.64 (d), 7.92 (t), 9.40 (s)

REFERENTIAL EXAMPLE 20

In 10 ml of chloroform was suspended 0.46 g of anisic acid, and then 0.42 ml of triethylamine was added thereto to dissolve the solid content. To the solution was added, with stirring and ice-cooling, 0.29 ml of ethyl chlorocarbonate, and the mixture was stirred for 15 minutes to give the mixed acid anhydride. After 2.26 g of mono(6-amino-6-deoxy)-β-cyclodextrin was dissolved in 20 ml of pyridine, a chloroform solution of the above mixed acid anhydride was added thereto with ice-cooling and stirring, followed by stirring at room temperature overnight. The solvent was removed by evaporation, and after the residue was washed, the resulting powder was collected by filtration, dissolved in 50 ml of 0.2N aqueous potassium hydroxide and heated at 90° C. for 30 minutes. The resulting solution was cooled and made acidic with hydrogen chloride, followed by passing through a column packed with a CHP-20-RESIN (trade name; manufactured by Mitsubishi Kasei Corporation). The column was washed successively with 500 ml of water and 1 l of a 30% aqueous methanol to collect the eluate. The solvent was evaporated off, and the residue was washed and then dried to give 0.71 g of mono[6-deoxy-6-(4-methoxybenzoylamino)]-β-cyclodextrin as a white powder.

Yield=28%

$^1$H-NMR(DMSO-d$_6$)δ:3.80(s), 4.3–4.6 (m), 4.7–5.0 (m), 5.4–5.9 (m), 6.36 (d), 7.79 (d), 8.0–8.2 (br)

REFERENTIAL EXAMPLE 21

(1) In 1.2 l of pyridine was dissolved 114 g of β-cyclodextrin, and then 52 g of 2-naphthylsulfonyl chloride was added thereto with stirring and ice-cooling, followed by stirring at room temperature for 24 hours. After the reaction was quenched by pouring water to the reaction mixture, the solvent was removed by evaporation and 1 l of water was added to the residue, followed by heating to give a caramel-like product. The product was washed, dissolved in 1.5 l of a 70% aqueous methanol with heating. After the solution was concentrated to about 1 l, the precipitates thus formed were collected by filtration and dissolved in a 70% aqueous methanol with heating. After the insolubles were removed, the filtrate was left to stand, and the thus precipitated crystals were collected by filtration and dried to give 23.0 g of a mixture of tris[6-0-(2-naphthylsulfonyl)]-β-cyclodextrin /tetrakis-[6-0-(2-naphthanalenesulfonyl)]-β-cyclodextrin =1:1 as a white powder.

Yield=13% IR $v_{max}^{Nujol}$cm$^{-1}$:1350, 1160, 1080, 1030

$^1$H-NMR(DMSO-d$_6$)δ:7.5–8.5 (br, m, 24H)

(2) The product obtained in (1) was treated in the same manner as in Referential Example 2-(2)-a to give a mixture of tris(6-amino-6-deoxy)-β-cyclodextrin tetrakis(6-amino-6-deoxy)-β-cyclodextrin =1:1 as a white powder.

Yield =68.8% m.p. >220° C.

IR $v_{max}^{KBr}$cm$^{-1}$:3300, 1630, 1155, 1080, 1030

(3) The product obtained in (2) was treated in the same manner as in Referential Example 17 or 18 to give a mixture of tris(6-stearoylamino-6-deoxy) cyclodextrin/tetrakis(6-stearoylamino-6-deoxy) cyclodextrin=1:1 as a light brown powder.

Yield=76%

$^1$H-NMR(DMSO-d$_6$)δ:0.82 (t), 0.9–1.7 (m), 1.9–2.3 (br), 4.2–4.6 (br), 4.7–5.1 (m), 5.5–6.1 (m)

REFERENTIAL EXAMPLE 22

(1) 13.2 g of mono(6-0-mesitylenesulfonyl)-β-cyclodextrin and 100 ml of ethylenediamine were mixed, and the mixture was refluxed with heating for 6 hours and concentrated under reduced pressure. After addition of water and xylene to the reaction mixture, the resulting mixture was subjected three times to azeotropic distillation. The solvent was evaporated, and the residue was dissolved in 50 ml of water. The resulting solution was passed through a column packed with a strongly acidic ion exchange resin SK-1B(H+) (trade name, manufactured by Mitsubishi Kasei Corporation). After the column was washed with water, a 2N ammonium hydroxide solution was passed therethrough to collect an eluate. Solvent was evaporated from the elvates, and the residue was dried to give 4.6 g of mono(6-aminoethylamino-6-deoxy)-β-cyclodextrin as a white powder.

Yield=39%

$^1$H-NMR(DMSO-d$_6$)δ:2.4–2.7 (m), 2.6–2.8 (br), 2.7–3.0 (m), 3.2–3.5 (m), 3.5–3.9 (m), 3.0–4.2 (m), 4.2–5.5 (br), 4.82 (br, s)

(2) In 30 ml of methanol was suspended 1.18 g of the product obtained in (1), and 0.41 g of acetic anhydride was added thereto, followed by refluxing with heating for 8 hours. The reaction mixture was evaporated to dryness, washed with acetone and dissolved in water, followed by treatment with activated carbon. The thus treated aqueous solution was poured into acetone to effect crystallization. The crystals thus formed were collected by filtration and dried to give 1.23 g of mono[6-deoxy-6-(N,N'-diacetyl-2aminoethylamino)]-β-cyclodextrin as a white powder.

Yield=97%

$^1$H-NMR(DMSO-d$_6$)δ:1.77 (s), 1.91 (s), 2.8–4.0 (m), 4.0–4.7 (m), 4.84 (br, s), 5.4–6.1 (m), 7.7–8.1 (m)

REFERENTIAL EXAMPLE 23

(1) Bis(6-0-mesitylenesulfonyl)-β-cyclodextrin and ethylenediamine were treated in the same manner as in Referential Example 22-(1) to give bis[6-(2-aminoethylamino)-6-deoxy]-β-cyclodertrin.

Yield=36%

$^1$H-NMR(DMSO-d$_6$)δ:2.3–3.0 (m), 3.0–3.5 (m), 3.5–4.0 (m), 4.81 (s), 5.0–6.2 (br)

(2) The product obtained in (1) was treated in the same manner as in Referential Example 22-(2) to give bis[6-deoxy-6-(N, N'-dibenzoyl-2-aminoethylamino)]-β-cyclodextrin as a white powder.

Yield=91%

$^1$H-NMR(DMSO-d$_6$)δ:3.0–4.0 (m), 4.2–4.7 (m), 4.7–5.1 (m), 5.6–6.2 (m), 7.0–8.0 (m), 8.3–8.7 (m)

REFERENTIAL EXAMPLE 24

(1) Tris(6-0-mesitylenesulfonyl)-β-cyclodextrin and ethylenediamine were treated in the same manner as in Referential Example 22-(1) to give tris[6-(2-aminoethylamino)-6-deoxy]-β-cyclodextrin.

Yield=27%

$^1$H-NMR(DMSO-d$_6$)δ:2.3–2.7 (m), 2.7–3.0 (m), 3.0–3.5 (m), 3.5–3.9 (m), 3.9–5.5 (br), 4.83(s)

(2) The product obtained in (1) was treated in the same manner as in Referential Example 22-(2) to give tris[6-deoxy-6-(N, N'-dibenzoyl-2-aminoethylamino)]-β-cyclodextrin as a white powder.

Yield=90%

$^1$H-NMR(DMSO-d$_6$)δ:2.7–4.1 (m), 4.3–4.7 (m), 4.7–5.2 (m), 5.5–6.3 (m), 6.9–7.9 (m), 8.3–9.0 (br)

REFERENTIAL EXAMPLES 25 to 36

The corresponding starting compounds were treated in the same manner as in Referential Examples 17 to 21 to obtain the compounds as listed in the following Table 10.

TABLE 10

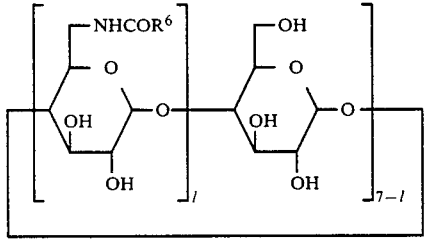

(III)

| Referential Example No. | Compound (III) R$^6$ | l | Form | Yield (%) | $^1$H-NMR (DMSO-d$_6$) δ |
|---|---|---|---|---|---|
| 25 | —CH(CH$_3$)$_2$ | 7 | White powder | 89 | 0.98(d), 4.84(d, 1H), 5.5–6.3(br), 7.85(br, s) |
| 26 | —(CH$_2$)$_4$CH$_3$ | " | Pale yellow powder | 68 | 0.7–1.0(br, t), 1.0–1.7(br, m), 2.0–2.3(br, t), 4.85(br, s), 5.7–6.0(br, s), 8.0(br, s) |
| 27 | —(CH$_2$)$_5$CH$_3$ | " | White powder | 61 | 0.8–1.0(br, t), 1.1–1.7(br, m), 2.0–2.3(br, t), 4.85(br, s), 5.5–6.2(br, s), 8.0(br, s) |
| 28 | —⟨C$_6$H$_4$⟩—CH$_3$ | " | " | 31 | 2.1(s), 4.95(br, s), 5.92(br, s), 6.92(d), 7.55(d), 7.98(br, s) |
| 29 | —⟨C$_6$H$_4$⟩(CH$_3$) | " | " | 22 | 2.15(s), 4.95(br, s), 4.87(br, s), 7.1(br, s), 7.48(br, s), 8.05(br) |
| 30 | —CH$_2$—⟨C$_6$H$_5$⟩ | 7 | White powder | 19 | 4.8(br, s), 5.85(br, s), 7.0(br, s), 8.25(br, s) |
| 31 | —(CH$_2$)$_{16}$CH$_3$ | 1 | " | 77 | 0.85(t), 1.23(s), 1.3–1.5(m), 1.9–2.3(m), 4.3–4.6(m), 4.83(br, s), 5.5–5.9(m), 7.4–7.6(br) |
| 32 | —(CH$_2$)$_6$CH$_3$ | " | " | 79 | 0.86(t), 1.23(s), 1.3–1.6(m), |

TABLE 10-continued

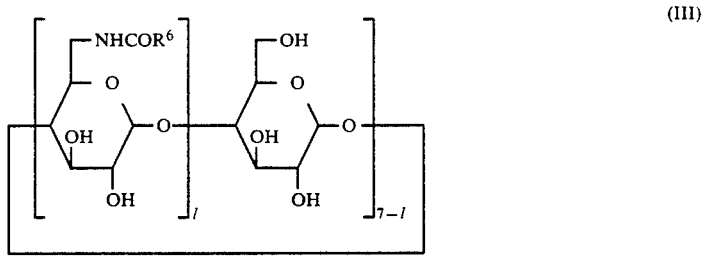

| Referential Example No. | Compound (III) R[6] | l | Form | Yield (%) | $^1$H-NMR (DMSO-$d_6$) δ |
|---|---|---|---|---|---|
| 33 | —(CH$_2$)$_4$CH$_3$ | " | " | 77 | 2.08(t), 4.45(d), 4.85(d), 5.5–6.0(m), 7.5–7.7(m) 0.85(t), 1.1–1.6(m), 2.08(t), 4.3–4.6(m), 4.83(d), 5.5–5.9(m), 7.5–7.7(m) |
| 34 | —(CH$_2$)$_{16}$CH$_3$ | 2 | " | 76 | 0.85(t), 1.23(s), 1.3–1.6(m), 1.9–2.3(m), 4.3–4.6(m), 4.83(br, s), 5.6–5.9(m), 7.4–7.7(br) |
| 35 | —(CH$_2$)$_6$CH$_3$ | 3.5* | " | 46 | 0.85(t), 1.22(s), 1.3–1.6(m), 1.9–2.3(m), 4.2–4.7(br), 4.7–5.0(m), 5.4–6.2(m) |
| 36 | —(CH$_2$)$_4$CH$_3$ | " | " | 56 | 0.84(br, s), 1.22(br, s), 1.3–1.7(m), 1.9–2.3(m), 4.2–4.7(m), 4.83(br, s), 5.4–6.2(m) |

Note)
*Mixture of compound (l = 3)/compound (l = 4) = 1:1

REFERENTIAL EXAMPLES 37 and 38

The corresponding starting compounds were treated in the same manner as in Referential Example 22 to obtain the compounds as listed in the following Table 11.

TABLE 11

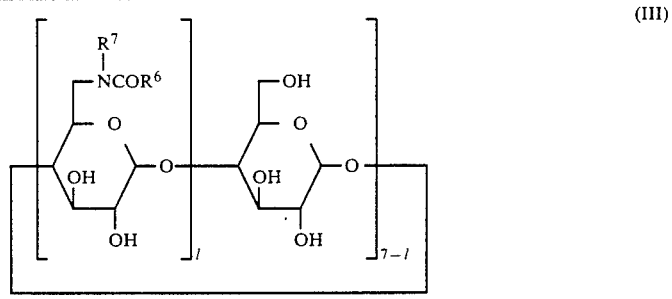

| Referential Example No. | Compound (III) R[6] and R[7] | l | Form | Yield (%) | $^1$H-NMR (DMSO-$d_6$) δ |
|---|---|---|---|---|---|
| 37 | R[6]: —CH$_3$<br>R[7]: —CH$_2$CH$_2$NHCOCH$_3$ | 3 | White powder | 90 | 1.7–2.1(m), 3.0–4.0(m), 4.3–4.7(m), 4.7–5.2(m), 5.6–6.2(m), 7.7–8.2(m) |
| 38 | R[6]: —C$_6$H$_5$<br>R[7]: —CH$_2$CH$_2$NHCO—C$_6$H$_5$ | 1 | Colorless powder | 82 | 3.0–4.1(m), 4.2–4.7(m), 4.7–5.1(m), 5.5–6.1(m), 7.2–8.0(m), 8.4–8.7(m) |

REFERENTIAL EXAMPLE 39

To 1 g of heptakis(6-amino-6-deoxy)-β-cyclodextrin was added 40 ml of a 10% aqueous sodium hydrogen carbonate, and then 3.3 g of benzenesulfonyl chloride was added dropwise thereto, followed by vigorous stirring at room temperature for 2 days. The precipitates thus formed were collected by filtration, washed with water and dried to give 1.3 g of heptakis(6-benzenesulfonylamino-6-deoxy)-β-cyclodextrin as a white powder.

Yield: 69%

$^1$H-NMR(DMSO-$d_6$)δ:4.75 (br, s), 5.7–5.9 (br, s), 7.4–8.0 (br, m)

REFERENTIAL EXAMPLE 40

(1) In 1.2 l of pyridine was dissolved 114 g of β-cyclodextrin, and under stirring of the resulting solution with ice cooling, 52 g of 2-naphthalenesulfonyl chloride was added thereto. After the reaction mixture was stirred at room temperature for 24 hours, water was added thereto to quench the reaction. The solvent was removed from the reaction mixture, and 1 l of water was added to the residue, followed by heating. The supernatant was decanted off, and the caramel-like substance thus obtained was washed with water and then dissolved in 1.5 l of a 70% aqueous methanol with heating. The resulting solution was concentrated to about 1 l, and the precipitates thus formed were collected by filtration. The precipitates were dissolved again in a 70% aqueous methanol with heating, and after the insolubles were removed by filtration, the filtrate was left to stand to allow crystallization. The crystals formed were collected by filtration and dried to give 23 g of a mixture of tris(6-0-naphthalenesulfonyl)-62-cyclodextrin/tetrakis-(6-0-cyclodestrin=1:1 as a white powder.

Yield: 13%

IR $\nu_{max}^{Nujol}cm^{-1}$:1350, 1160, 1008, 1030

$^1$H-NMR(DMSO-d$_6$)δ:7.5–8.5 (br, m, 24H)

(2) The product obtained in (1) was treated in the same manner as in Referential Example 2-(2)-a to give a mixture of tris(6-amino-6-deoxy)-β-cyclodextrin/tetrakis-(6-amino-6-deoxy)-β-cyclodextrin=1:1.

Yield:68.8% m.p.>220° C.

IR $\nu_{max}^{KBr}cm^{-1}$:3300, 1630, 1155, 1080, 1030

(3) The product obtained in Referential Example 21-(2) was treated in the same manner as in Referential Example 2-(3)-a to give a mixture of tris(6-benzenesulfonylamino-6-deoxy)-β-cyclodextrin/ tetrakis-(6-benzenesulfonylamino-6-deoxy)-β-cyclodestrin=1:1 as a white powder.

Yield: 54%

$^1$H-NMR(DMSO-d$_6$)δ:4.5–5.2 (m), 5.3–6.3 (br), 7.4–8.1 (m)

REFERENTIAL EXAMPLES 41 to 50

The corresponding starting compounds were treated in the same manner as in Referential Examples 39 to 40 to obtain the compounds as listed in the following Table 12.

TABLE 12

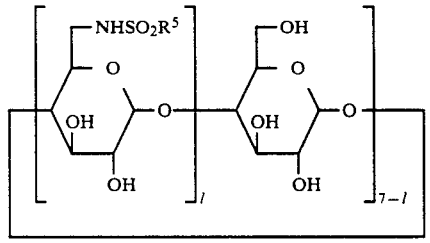

(III)

| Referential Example No. | Compound (III) R$^5$ | l | Form | Yield (%) | $^1$H-NMR (DMSO-d$_6$) δ |
|---|---|---|---|---|---|
| 41 | 2-naphthyl | 1 | White powder | 61 | 4.5–5.0(m), 5.0–6.5(br), 7.5–8.4(m) |
| 42 | 2-naphthyl | 3.5* | " | 52 | 4.5–5.2(m), 5.4–6.2(br), 7.4–8.6(m) |
| 43 | 4-methylphenyl | 7 | " | 73 | 2.3(s), 4.75(br, s), 5.8(br, s), 7.0(br, s), 7.2–7.8(m) |
| 44 | 4-methoxyphenyl | 7 | Light yellow powder | 43 | 4.75(br, s), 5.8(br, s), 6.8–7.9(br, m) |
| 45 | 4-chlorophenyl | " | Light yellow powder | 35 | 4.75(br, s), 5.77(br, s), 7.2–8.0(br, m) |
| 46 | 2-thienyl | " | Light yellow powder | 42 | 4.8(br, s), 5.82(br, s), 7.1(t), 7.43(br, s), 7.6(d), 7.84(d) |

TABLE 12-continued

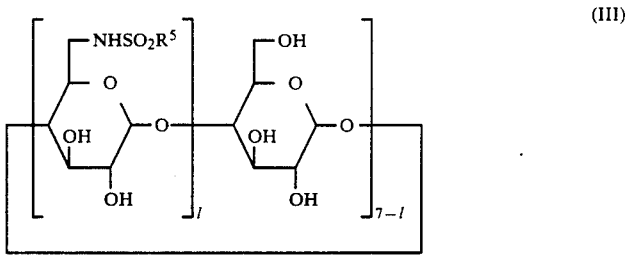
(III)

| Referential Example No. | Compound (III) R[5] | l | Form | Yield (%) | $^1$H-NMR (DMSO-d6) δ |
|---|---|---|---|---|---|
| 47 | (4,5-dimethylisoxazol-3-yl) | " | White powder | 17 | 2.28(s), 2.5(s), 4.8(br, s), 5.8(br, s) |
| 48 | (2,4-dimethylthiazol-5-yl) | " | Light yellow powder | 19 | 2.45(s), 2.60(s), 4.74(br, s), 5.8(br, s), 7.46(br, s) |
| 49 | $-(CH_2)_4CH_3$ | " | White powder | 12 | 0.85(t), 1.28(s), 1.7(br, s), 4.95(br, s), 5.8(br, s), 6.55(br, s) |
| 50 | $-(CH_2)_{16}CH_3$ | 1* | " | 39 | 0.88(t), 1.25(s), 1.5–1.8(m), 4.83(d), 4.94(d), 5.0–6.3(br) |

Note)
*Mixture of compound (l = 3)/compound (l = 4) = 1:1

REFERENTIAL EXAMPLE 51

To 2 g of heptakis(6-0-mesitylenesulfonyl)-β-cyclodextrin was added 15 ml of benzylamine to effect reaction at 80° to 90° C. for 3 hours. To the reaction mixture was added 150 ml of water, and the precipitates thus formed were collected by filtration, washed with water and dried to give 1.1 g of heptakis(6-benzylamino-6-deoxy)-β-cyclodextrin as a white powder.

$^1$H-NMR(DMSO-d6)δ:2.83 (br), 4.85 (br, d), 5.8 (br, s), 7.18 (br, s)

REFERENTIAL EXAMPLES 52 to 62

Mono(6-0-mesitylenesulfonyl)-β-cyclodestrin, bis(6-0-mesitylenesulfonyl)-β-cyclodestrin or heptakis(6-0-mesitylenesulfonyl)-β-cyclodextrin were treated with the corresponding amine compounds in the same manner as in Referential Example 51 to give the compounds as listed in the following Table 13.

TABLE 13

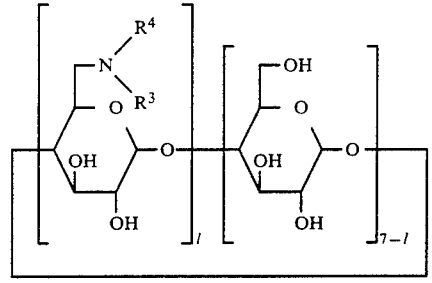
(III)

| Referential Example No. | Compound (III) $-N(R^3)(R^4)$ | l | Form | Yield (%) | 1H-NMR (DMSO-d6) |
|---|---|---|---|---|---|
| 52 | $-N(CH_3)_2$ | 7 | White powder | 68 | 2.15(s), 4.84(br, s), 5.71(br, s) |
| 53 | $-NH(CH_2CH_2OH)$ | " | Pale yellow powder | 80 | 2.6(br, t), 2.82(br, m)4.77(d)* |
| 54 | $-NH(CH_2CHOHCH_2OH)$ | " | White powder | 50 | 2.85(br, s), 4.86(br, s) |

TABLE 13-continued

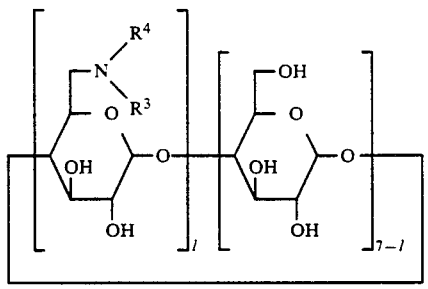
(III)

| Referential Example No. | Compound (III) −N(R⁴)(R³) | l | Form | Yield (%) | 1H-NMR (DMSO-d6) |
|---|---|---|---|---|---|
| 55 | piperidinyl (N in ring) | " | Yellow powder | 75 | 1.45(br, s), 2.0–3.0(br), 4.85(br, s), 5.82(br, s) |
| 56 | −NH−CH₂−cyclohexyl | " | Light brown powder | 79 | 1.1(br, s), 1.65(br, s), 4.83(br, s), 5.67(br, s) |
| 57 | −NH−phenyl | 7 | Brown powder | 53 | 3.0–4.1(m), 4.9(br, s), 5.2–5.8(br, s) 6.4–7.4(m) |
| 58 | −NH−CH₂CH₂−phenyl | " | White powder | 69 | 2.71(br, s), 2.9(br, s), 3.31(br, s), 4.8(br, s), 5.73(br, s), 7.11(br, s) |
| 59 | −N(CH₃)−CH₂CH₂−phenyl | " | Light brown powder | 50 | 2.20(br, s), 2.6(br, s), 3.30(br, s), 4.8(br, s), 5.78(br, s), 7.15(br, s) |
| 60 | −NH−CH₂−phenyl | 1 | White powder | 84 | 3.2–3.9(m), 4.3–4.6(m), 4.7–4.9(m), 5.6–5.9(m), 7.1–7.4(m) |
| 61 | " | 2 | White powder | 59 | 3.2–3.9(m), 4.3–4.7(m), 4.7–5.0(m), 5.5–5.9(m), 7.1–7.4(m) |
| 62 | −NH−(4-OCH₃-phenyl) | 7 | Brown powder | 81.5 | 3.1–4.2(br, m), 3.52(s), 4.95(s), 6.54(s) |

Note)
*Values are measured at ¹H-NMR(D₂O)δ

REFERENTIAL EXAMPLES 63 to 79

The corresponding starting compounds were treated in the same manner as in Referential Example 2, Referential Example 5, Referential Example 20 or Referential Example 51 to give the compounds as listed in the following Table 14.

TABLE 14

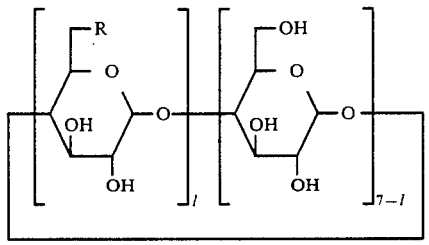
(III)

| Referential Example No. | Compound (III) R | l | Form | Yield (%)* | $^1$H-NMR (DMSO-$d_6$) |
|---|---|---|---|---|---|
| 63 | −S−CH$_2$−C$_6$H$_4$−Cl | 3 | Colorless powder | 64 | 2.5–4.0(m), 4.5–4.8(m), 4.8–5.1(m), 5.5–6.1(m), 7.2–7.6(m) |
| 64 | −S−CH$_2$−C$_6$H$_4$−OMe | 3 | Colorless powder | 67 | 2.5–4.2(m), 3.70(s), 4.4–4.8(m), 4.8–5.0(m), 5.6–6.0(m), 6.7–6.9(m), 7.0–7.3(m) |
| 65 | −S−CH$_2$−C$_6$H$_4$−OCH$_3$ | 7 | White powder | 84.2 | 3.7(s), 4.90(br.s), 6.8(br.s) 7.15(br.d) |
| 66 | −S−C$_6$H$_4$−Cl | 7 | Light yellow powder | 100 | 4.95(br.s), 7.1(s) |
| 67 | −S−C$_6$H$_4$−CH$_3$ | 7 | Light yellow powder | 75.8 | 2.14(s), 4.95(br, s), 6.8–7.4(m) |
| 68 | −S−C$_6$H$_4$−OCH$_3$ | 7 | Light yellow powder | 100 | 3.55(s), 4.9(br, s), 6.6–7.5(m) |
| 69 | −NH−C$_6$H$_4$−Cl | 7 | Brown powder | 42 | 4.85(br, s), 6.5(d), 6.9(d) |
| 70 | −NH−C$_6$H$_4$−CH$_3$ | 7 | Blakish brown powder | 69 | 2.1(s), 5.9(br, s), 6.3–6.6(d) 6.6–6.8(d) |
| 71 | −NH−C$_6$H$_4$−OMe | 1 | Colorless powder | 64 | 3.1–4.3(m), 3.62(s), 4.4–4.8(m), 4.84(br, s), 5.6–6.2(m), 6.59(d), 6.69(d) |
| 72 | −NH−C$_6$H$_4$−OMe | 3 | Light brown powder | 42 | 3.0–4.0(m), 4.7–5.0(m), 5.5–6.1(m), 6.4–6.8(m) |
| 73 | −NH−CH$_2$−C$_6$H$_4$−OCH$_3$ | 7 | Light brown powder | 51.0 | 2.75(br, s), 4.82(br, s), 6.6–7.2(m) |

TABLE 14-continued

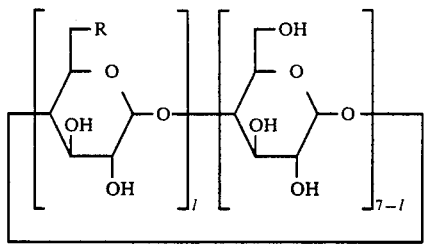

(III)

| Referential Example No. | Compound (III) R | l | Form | Yield (%)* | ¹H-NMR (DMSO-d₆) |
|---|---|---|---|---|---|
| 74 | —NH—C₆H₃(OCH₃)₂ (2,3-dimethoxyphenyl) with OCH₃, OCH₃ | 7 | Blakish brown powder | 40 | 3.43(s), 3.50(s), 4.90(br, s) 5.75(br, s), 6.2–6.9(m) |
| 75 | —NH—C₆H₂(OCH₃)₃ (3,4,5-trimethoxyphenyl) | 7 | Blakish brown powder | 45 | 3.47(s), 4.90(br, s), 5.90(d) |
| 76 | —NHSO₂—C₆H₅ | 7 | White powder | 69 | 4.75(br, s), 7.4–8.0(br, m) |
| 77 | —NHSO₂—C₆H₂(CH₃)₃ (mesityl) | 7 | White powder | 52.8 | 2.20(s), 2.40(s), 4.5(br, s), 6.7(br, s), 6.9(s) |
| 78 | —NHCO—C₆H₄—OMe | 7 | White powder | 44 | 3.3(s), 4.9(br, s), 6.5(d), 7.6(d) |
| 79 | —NHCO—CH₂CH₂—C(O)—pyrenyl | 2 | Light yellow powder | 97 | 2.5–2.9(m), 3.1–4.0(m), 4.4–5.1(m), 5.6–6.0(m), 7.7–7.9(br), 8.0–8.7(m) |

REFERENTIAL EXAMPLE 80

(1) In 600 ml of pyridine was suspended 39.1 g of a dried γ-cyclodextrin, and 26 g of mesitylenesulfonyl chloride was added thereto under stirring at room temperature, followed by stirring at room temperature overnight. Water was added to the reaction mixture and the mixture was evaporated to remove solvent. The residue was washed with water and then with ethanol. The resultant powder was collected by filtration, and dissolved in methanol. The solution was applied onto a column packed with CHP-20 RESIN (trade name, manufactured by MITSUBISHI KASEI Corporation), and the column was washed with 50% methanol and then with 65% methanol. Then, 80% methanol was passed through the column to elute tris(6-0-mesitylenesulfonyl)-γ-cyclodextrin, and then methanol was passed through the column to elute tetrakis(6-0-mesitylenesulfonyl)-γ-cyclodextrin.

(2) The 80% methanol eluate was evaporated to dryness, and the residue was dissolved in methanol. The solution was applied onto a column packed with CHP-20 RESIN (trade name, manufactured by MITSUBISHI KASEI Corporation), and the column was washed with 70% methanol. Then 80% methanol was passed through the column to collect three fractions (fraction A, B and C).

The retention time of each fraction was examined by high performance liquid chromatography. The results are as follows.

Fraction A; (retention time) 7.4, 9.0, 9.5, 11.5 (min)
Fraction B; (retention time) 11.6 (min)
Fraction C; (retention time) 7.4 (min)

Each of fractions was evaporated to dryness, whereby the following products (i.e., regio isomers of tris (6-O-mesitylenesulfonyl)-γ-cyclodextrin.) were obtained as colorless powder.

(a) Tris(6-0-mesitylenesulfonyl)-γ-cyclodextrin prepared from fraction A
Yield 5.0 g
m.p. 188° C. (decomposed)

(b) Tris(6-0-mesitylenesulfonyl)-γ-cyclodextrin prepared from fraction B
Yield 1.12 g
m.p. 192° C. (decomposed)

(c) Tris(6-0-mesitylenesulfonyl)-γ-cyclodextrin prepared from fraction C
Yield 1.20 g m.p. 190° C. (decomposed)

On the other hand, the methanol eluate obtained in paragraph (1) was evaporated to dryness. The residue (i.e., crude tetrakis(6-0-mesitylenesulfonyl)-γ-cyclodextrin were dissolved in 100 ml of pyridine and 7.2 g of mesitylenesulfonyl chloride were added thereto. The mixture was stirred at room temperature for 2 days. Then, the reaction mixture was evaporated to dryness, and the residue was purified by silica gel column chromatography to give 0.93 g of octakis(6-0-mesitylenesulfonyl)-γ-cyclodextrin as colorless powder.

m.p. 230° C. (decomposed)

(3) To a mixture of 0.49 g of benzylmercaptane, 10 ml of N,N-dimethylformamide and 0.17 g of 60% sodium hydride was added 1.0 g of tris(6-0-mesitylenesulfonyl)-γ-cyclodextrin (obtained from fraction A). The mixture was stirred at 80° C. for 2 hours. After cooling, water was added to the mixture. and the precipitates were collected by filtration and dissolved in methanol. The methanol solution was treated with activated charcoal and then condensed. Acetone was added to the residue, and the precipitates were collected by filtration. The crude product (0.51 g) thus obtained was dissolved in N,N-dimethylformamide, and the solution was applied on a column packed with Sephadex G-25 (trade name, manufactured by Pharmacia AB). The eluate with N,N-dimethylformamide was evaporated to dryness, and the residue was washed with acetone and then dried. 0.28 g of tris(6-benzylthio-6-deoxy)-γ-cyclodextrin was obtained as colorless powder.

m.p. 233° C. (decomposed)

Each of tris(6-0-mesitylenesulfonyl)-γ-cyclodextrin (obtained from fraction B and C) was treated in the same manner as above to obtain the compounds as listed in the following Table 15.

TABLE 15

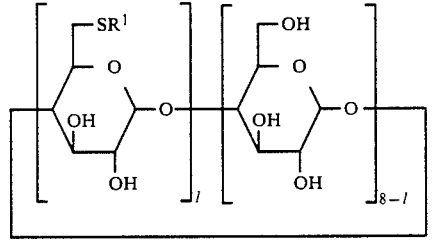

(II)

| Referential Example No. | Compound (II) R¹ | l | Form | Physical properties etc. |  |
|---|---|---|---|---|---|
|  |  |  |  | Yield (%) | ¹H-NMR (DMSO-d₆) δ |
| 80* (3) | —CH₂—⟨phenyl⟩ | 3 | Colorless powder | 30 | 2.5–3.1(m), 3.3–4.0(m), 4.4–4.3(m), 4.91(br, s), 5.5–6.1(m), 7.23(br, s) |
| 80* (3) | —CH₂—⟨phenyl⟩ | 3 | Colorless powder | 27 | 2.5–3.1(m), 3.2–4.0(m), 4.4–4.3(m), 4.91(br, s), 5.6–6.1(m), 7.1–7.4(m) |
| 80 (3) | —CH₂—⟨phenyl⟩ | 8 | Colorless powder | 44 | 2.6–3.9(m), 4.94(s), 5.7–6.1(m), 7.15(br, s) |

*Regio isomers of the compound prepared from fraction A. (obtained in Referential Example 80 (3))

REFERENTIAL EXAMPLE 81

To a mixture of 0.83 g of p-toluenethiol, 30 ml of N,N-dimethylformamide and 0.25 g of 62.7% sodium hydride was added 1 g of hexakis (6-bromo-6-deoxy)-α-cyclodextrin, and the mixture was stirred in argon gas stream at room temperature for 20 hours. The reaction mixture was poured into 200 ml of water, and the precipitates were collected by filtration, washed and then dried to give 1.0 g of hexakis (6-p-tolylthio-6-deoxy)-α-cyclodextrin as a white powder.

m.p. 232°–235° C. (decomposed)

REFERENTIAL EXAMPLE 82

To 0.6 g of hexakis (6-amino-6-deoxy)-α-cyclohextrin hydrochloride was added 60 ml of an aqueous 10% sodium bicarbonate solution, and 0.6 g of 2-thenoyl chloride was added thereto. The mixture was stirred at room temperature for 3 days, the precipitates was collected by filtration, washed and dried to give 0.54 g of hexakis [6-(2-thenoylamino)-6-deoxy]-α-cyclodextrin as white powder.

m.p. 258°–260° C. (decomposed)

TEST EXAMPLE

HIV Proliferation Inhibitory Action

Principle

It is known that when MT-4 cells, which are sustaining infectious cell line of human T-cell Leukemia virus I type [HTLV-I], are infected with HIV, HIV proliferates rapidly and the MT-4 cells are killed in 5 to 6 days due to the cellular damage. Therefore, HIV proliferation inhibitory action can be evaluated by examining the number of vial cells of the MT-4 cells infected with HIV.

Procedure

MT-4 cells were infected with HIV (a culture supernatant of TALL-1/LAV-1) at 37° C. for one hour so that $TCID_{50}$ (median tissue culture infectious dose)/cell might be 0.001, followed by washing with the medium. The infected MT-4 cells were then suspended at a concentration of $1 \times 10^5$ cells/ml in RPMI-1640 culture media [containing 10% of FCS (fetal calf serum)] containing samples of various concentrations respectively. Each of the thus obtained cell suspension was introduced in a flat-bottom culture plate and was incubated at 37° C. in the presence of 5% carbon dioxide for 5 days. After incubation, the number of viable cells in the cell suspension was counted by the Tripan-Blue Staining Method. The HIV proliferation inhibitory action of the sample was evaluated in terms of the concentration of the sample which suppresses by 100% (completely) the infectiousness and the cell modification action of HIV.

Results

The results are shown in the following Table 16

TABLE 16

| Test compound | HIV proliferation inhibitory action, 100% inhibition concentration (μg/ml) |
| --- | --- |
| Polysulfate compound prepared in Example 2 (Potassium salt) | 1.9 |
| Polysulfate compound prepared in Example 8 (Potassium salt) | 3.9 |
| Polysulfate compound prepared in Example 9 (Potassium salt) | 1.95 |
| Polysulfate compound prepared in Example 10 (Potassium salt) | 0.98 |
| Polysulfate compound prepared in Example 11 (Potassium salt) | 2.98 |
| Polysulfate compound prepared in Example 12 (Potassium salt) | 3.9 |
| Polysulfate compound prepared in Example 13 (Potassium salt) | 3.9 |
| Polysulfate compound prepared in Example 17 (Potassium salt) | 1.95 |
| Polysulfate compound prepared in Example 18 (Sodium salt) | 3.9 |
| Polysulfate compound prepared in Example 20 (Sodium salt) | 3.9 |
| Polysulfate compound prepared in Example 22 (Sodium salt) | 3.9 |
| Polysulfate compound prepared in Example 25 (Sodium salt) | 3.9 |
| Polysulfate compound prepared in Example 27 (Potassium salt) | 1.95 |
| Polysulfate compound prepared in Example 28 (Potassium salt) | 1.95 |
| Polysulfate compound prepared in Example 29 (Potassium salt) | 3.9 |
| Polysulfate compound prepared in Example 30 (Potassium salt) | 3.9 |
| Polysulfate compound prepared in Example 32 (Potassium salt) | 1.95 |
| Polysulfate compound prepared in Example 33 (Potassium salt) | 1.95 |
| Polysulfate compound prepared in Example 34 (Potassium salt) | 3.9 |
| Polysulfate compound prepared in Example 35 (Potassium salt) | 3.9 |
| Polysulfate compound prepared in Example 36 (Potassium salt) | 3.9 |
| Polysulfate compound prepared in Example 37 (Potassium salt) | 3.9 |
| Polysulfate compound prepared in Example 38 (Potassium salt) | 1.95 |
| Polysulfate compound prepared in Example 41 (Sodium salt) | 3.9 |
| Polysulfate compound prepared in Example 42 (Potassium salt) | 3.9 |
| Polysulfate compound prepared in Example 43 (Potassium salt) | 1.95 |
| Polysulfate compound prepared in Example 44 (Potassium salt) | 1.95 |
| Polysulfate compound prepared in Example 45 (Potassium salt) | 1.95 |
| Polysulfate compound prepared in Example 46 (Potassium salt) | 3.9 |
| Polysulfate compound prepared in Example 50 (Sodium salt) | 3.9 |
| Polysulfate compound prepared in Example 51 (Sodium salt) | 3.9 |
| Polysulfate compound prepared in Example 52 (Sodium salt) | 3.9 |
| Polysulfate compound | 1.95 |

TABLE 16-continued

| Test compound | HIV proliferation inhibitory action, 100% inhibition concentration (μg/ml) |
|---|---|
| prepared in Example 54 (Potassium salt) | |
| Polysulfate compound prepared in Example 57 (Sodium salt) | 3.9 |
| Polysulfate compound prepared in Example 61 (Sodium salt) | 1.95 |
| Polysulfate compound prepared in Example 64 (Sodium salt) | 3.9 |
| Polysulfate compound prepared in Example 66 (Potassium salt) | 0.98 |
| Polysulfate compound prepared in Example 67 (Sodium salt) | 0.98 |
| Polysulfate compound prepared in Example 68 (Sodium salt) | 1.95 |
| Polysulfate compound prepared in Example 69 (Sodium salt) | 1.95 |
| Polysulfate compound prepared in Example 70 (Sodium salt) | 3.90 |
| Polysulfate compound prepared in Example 71 (Sodium salt) | 1.95 |
| Polysulfate compound prepared in Example 72 (Sodium salt) | 1.95 |
| Polysulfate compound prepared in Example 75 (Sodium salt) | 3.9 |
| Polysulfate compound prepared in Example 76 (Potassium salt) | 3.9 |
| Polysulfate compound prepared in Example 77 (Potassium salt) | 1.95 |
| Polysulfate compound prepared in Example 79 (Potassium salt) | 3.8 |
| Polysulfate compound prepared in Example 81 (Potassium salt) | 3.9 |
| Polysulfate compound prepared in Example 84 (Potassium salt) | 0.98 |
| Polysulfate compound prepared in Example 85 (Potassium salt) | 1.95 |
| Polysulfate compound prepared in Example 86 (Potassium salt) | 1.50 |
| Polysulfate compound prepared in Example 87 | 1.95 |

TABLE 16-continued

| Test compound | HIV proliferation inhibitory action, 100% inhibition concentration (μg/ml) |
|---|---|
| (Potassium salt) | |

Effect of the Invention

The polysulfate compound according to this invention is characterized by an excellent antiretrovirus action, particularly an excellent HIV proliferation inhibitory action as described above and further by low toxicity, proving high safety as pharmaceuticals.

The present polysulfate compound further shows only a low level of side effects such as anticoagulant action specific to sulfated polysaccharides.

What we claim is:

1. A compound which is a polysulfate of a cyclodextrin in which at least one of 6 to 8 D-glucose units constituting the cyclodextrin has been replaced by a unit represented by Formula (I):

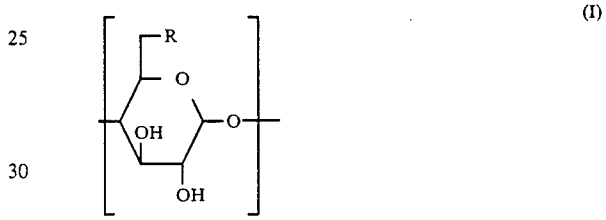

wherein R is a group represented by the formula:

—SR$^2$ where R$^2$ is a C$_{1-20}$ alkyl group; a C$_{1-4}$ alkyl having 1 to 3 substituents selected from the group consisting of a phenyl group, a halogeno-substituted phenyl group and a C$_{1-4}$ alkoxy-substituted phenyl group; a phenyl group; a halogeno-substituted phenyl group; a C$_{1-4}$ alkyl-substituted phenyl group; a C$_{1-4}$ alkoxy-substituted phenyl group; or a purinyl group, or a salt thereof.

2. A compound according to claim 1, which is a polysulfate of a β-cyclodextrin in which at least one of 7 D-glucose units has been replaced by a unit represented by Formula (I), or a salt thereof.

3. The compound according to claim 1, which is a polysulfate of a γ-cyclodextrin in which at least one of 8 D-glucose units has been replaced by a unit represented by Formula (I), or a salt thereof.

4. The compound according to claim 1, in which the number of sulfate groups in said polysulfate of a cyclodextrin is 8 to 23.

5. The compound according to claim 1, in which R is a benzylthio group, a 4-chlorobenzylthio group, a 4-methoxybenzylthio group, a 4-methylphenylthio group, a 4-methoxyphenylthio group or a purinylthio group.

* * * * *